(12) United States Patent
Kleinschmidt

(10) Patent No.: US 6,750,832 B1
(45) Date of Patent: Jun. 15, 2004

(54) INFORMATION DISPLAY SYSTEM FOR AT LEAST ONE PERSON

(75) Inventor: Peter Kleinschmidt, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/331,493

(22) PCT Filed: Nov. 20, 1997

(86) PCT No.: PCT/DE97/02731

§ 371 (c)(1),
(2), (4) Date: Jun. 21, 1999

(87) PCT Pub. No.: WO98/28649

PCT Pub. Date: Jul. 2, 1998

(30) Foreign Application Priority Data

Dec. 20, 1996 (DE) .......................................... 196 53 594
Feb. 28, 1997 (DE) .......................................... 196 03 569

(51) Int. Cl.⁷ .................................................. G09G 5/00
(52) U.S. Cl. .............................. 345/7; 345/9; 359/630; 359/634; 359/742; 362/494; 362/140; 362/268; 362/293; 362/510; 362/309
(58) Field of Search ......................... 345/7, 9; 359/400, 359/631, 630; 340/705; 350/174; 362/494, 140, 268, 293, 510, 309

(56) References Cited

U.S. PATENT DOCUMENTS

| | | | | |
|---|---|---|---|---|
| 4,740,780 A | | 4/1988 | Brown et al. | |
| 4,755,804 A | * | 7/1988 | Levati et al. | 340/642 |
| 4,790,613 A | * | 12/1988 | Moss | 350/3.7 |
| 4,805,988 A | | 2/1989 | Dones | |
| 5,013,135 A | * | 5/1991 | Yamamura | 340/705 |
| 5,134,520 A | * | 7/1992 | Yamamura | 359/630 |
| 5,361,190 A | * | 11/1994 | Roberts et al. | 362/61 |
| 5,497,271 A | * | 3/1996 | Mulvanny et al. | 345/7 |
| 5,506,595 A | | 4/1996 | Fukano et al. | |
| 5,619,373 A | * | 4/1997 | Meyerhofer et al. | 345/7 |
| 6,009,355 A | * | 12/1999 | Obradovich et al. | 701/29 |
| 6,290,378 B1 | * | 9/2001 | Buchalla et al. | 362/494 |

FOREIGN PATENT DOCUMENTS

| | | |
|---|---|---|
| EP | 0 194 196 | 9/1986 |
| EP | 0 433 145 | 6/1991 |
| GB | 2 022 285 | 12/1979 |
| GB | 2 246 900 | 2/1992 |

* cited by examiner

Primary Examiner—Richard Hjerpe
Assistant Examiner—Ali Zamani
(74) Attorney, Agent, or Firm—Morrison & Foerster LLP

(57) ABSTRACT

An information display system having an output display for presenting information. Optical means are provided that deflect an illumination beam path into the field of view of the observer. Further, a subdividable output display is created that makes it possible to partly obtain information in a vehicle via a head-up display and partly via a traditional or back-projection display. Given seats arranged in rows, for example in airplanes or buses, back rests of preceding seats contain an output display and a communication interface to the seat of the viewer.

16 Claims, 19 Drawing Sheets

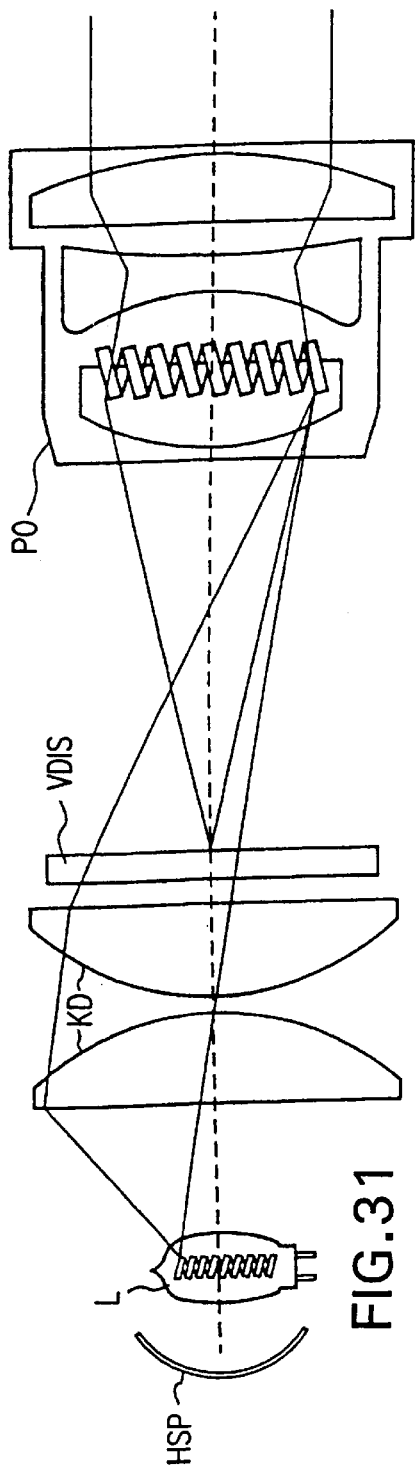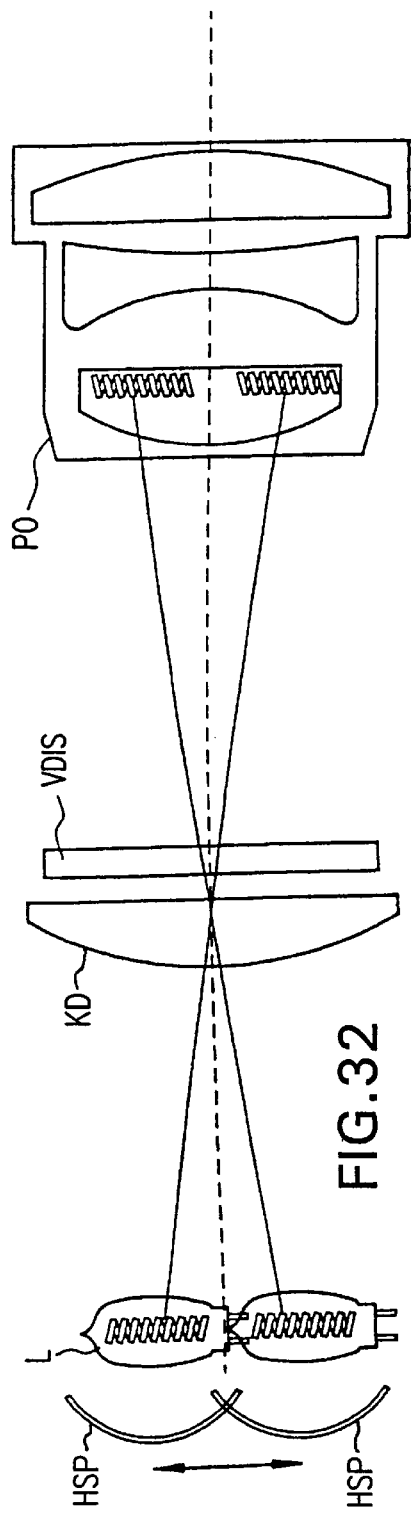

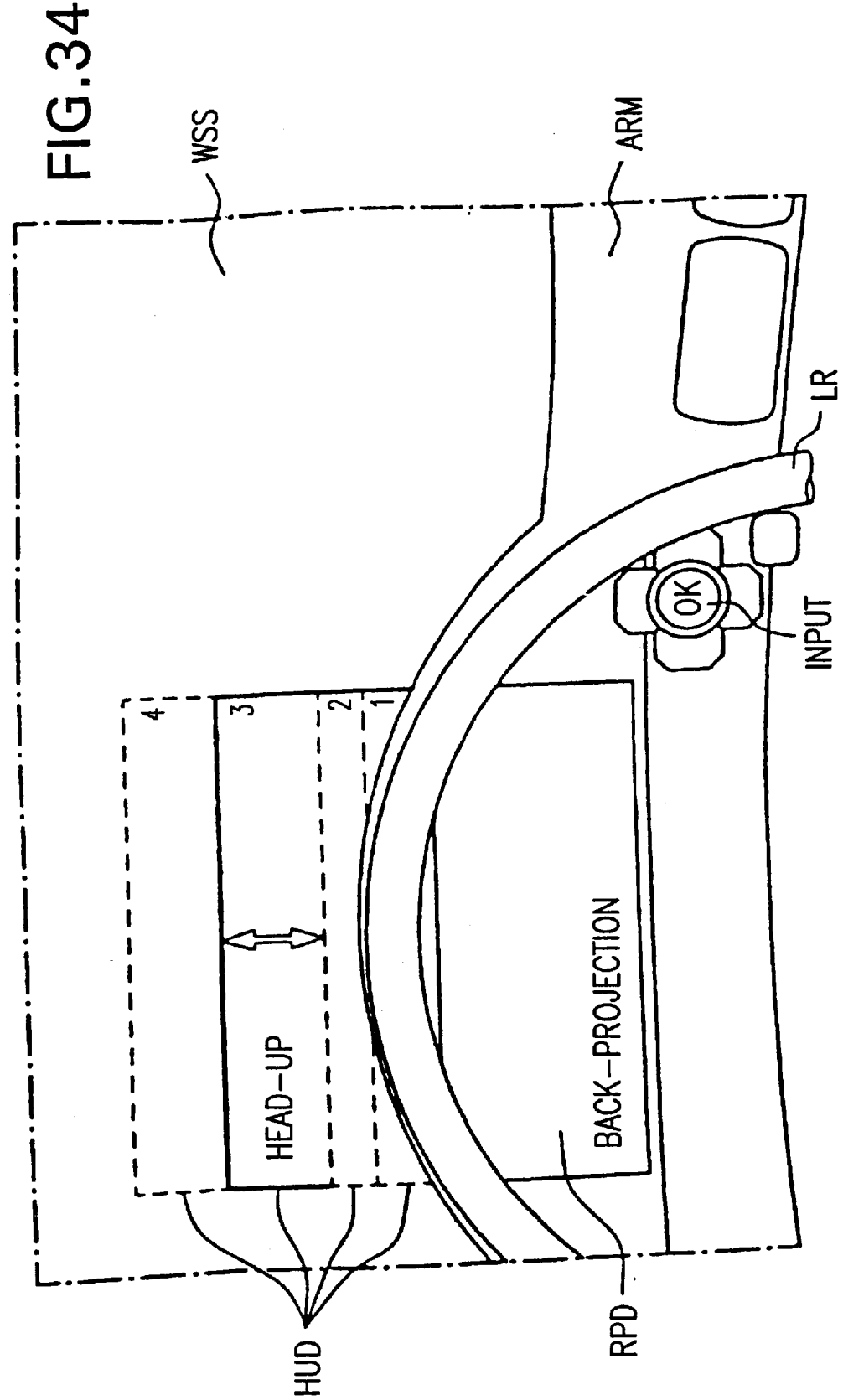

INFORMATION DISPLAY SYSTEM FOR AT LEAST ONE PERSON

BACKGROUND OF THE INVENTION

The invention is directed to an information display system for at least one person.

Information display systems for persons or users can be versatilely employed. One example is for conveying information to the driver of a vehicle, for example of a motor vehicle. In order to inform the driver of information, for example about the traffic situation, electronic routing and information systems can be attached to the dashboard of a motor vehicle. The systems are preferably installed at optimally high positions, i.e. close to the windshield. Other devices for information display can be secured with a mount or a pivot arm to the right of the steering wheel, given left-hand steering, and optimally high at the dashboard. All of these installation measures, however, demand that the driver look away from the road to the information display system. Further, the driver must change the focal setting of its eye from infinite to the short distance to the display system. Persons having imperfect vision potentially need different eye glasses for this purpose. Moreover, the displays are usually small. Future studies indicate a large display that attached in the proximity of the windshield on the dashboard counsel. The problem of different distance vision is then in fact is diminished but not yet entirely eliminated. Moreover, large displays are expensive.

SUMMARY OF THE INVENTION

It is an object of the present invention to provide an information display system that presents information optimally well, wherein adequate legibility of an output display is also still assured given movement of the viewer. This problem is solved in an information display system according to the present invention.

Given the present inventive information display system, the information to be communicated to a person is generated on an output display at a location that is not critical for use. With the assistance of first and second optical means, the presentation of information generated by the output display can then be mirrored into the direction of view of the user and a virtual image of the presentation can be simultaneously generated at a distance from the user. Finally, an operating arrangement is advantageously provided with which the information to be displayed can be called in a simple way.

It is advantageous that the second optical means is a pane arranged in the direction of view of the user that, for example, is already present, in the case of a windshield in a motor vehicle.

In order to disturb the field of view of the user or driver as little as possible, it is advantageous to mirror the presentation of the information close to the bottom edge or to the top edge or perpendicularly aligned at the right-hand or left-hand edge of the pane.

In order to make the location of mirroring the information into the pane and, thus, the location of the virtual image adjustable, it is advantageous to likewise adjustably arrange the output display or to realize the first optical means such that they are pivotable. For example, a concave mirror can thereby be employed as first optical means, this being arranged in the viewing direction of the user and mirroring the presentation into the viewing direction of the user and which, moreover, can also be pivotably implemented in order to make the location of the creation of the virtual image adjustable. The concave mirror can then be arranged such that the output display can be closed with it.

The output display can be operated such that it generates a presentation of the information composed of at least two sub-regions, the one sub-region thereof exhibiting no interaction possibility with the user and the other sub-region exhibiting units or devices that can be addressed with the operating arrangement.

The output display can then be selected by the user via the operating arrangement and the information displayed thereat can be selected. The sub-regions can, for example, represent maps, excerpts from maps or possible settings of the operating arrangements. One sub-region can thereby represent a map and the virtual image can thereby represent a selectable, magnified excerpt from the map and the map.

It can be advantageous to implement the second optical means such that the virtual images can be seen by more than one person, whereby the persons can call the information to be displayed independently from one another with the operating arrangement. However, it is also possible that only one person can call the information to be displayed with the operating arrangement and, thus, can play the information for, for example, the driver of a motor vehicle, the driver needing this information at the moment and then not having to actuate the operating arrangement.

In order to have the presentations output by the output display always fall within the eye of the user, it is advantageous to provide a video camera directed onto the person that identifies the location of the eyes of the person or of the user and tracks them and correspondingly controls the first optical means, for example the concave mirror.

There are various solutions for the realization of the operating arrangement. An operating means having a navigator that can be operated blind, for example with operating elements and/or with voice input means, can be provided as an operating arrangement, as can an answer back arrangement that acknowledges the operating events and provides prompts for further operating steps that can be implemented.

It could be advantageous to implement the voice input means as a directional microphone. It is then advantageous to make the directional lobe for command input pivotable and to always align it to the mouth of the user, for example the driver. Such an operating arrangement can also be implemented such that a video camera directed onto the person and image recognition software are provided with which the position of the mouth of the user is identified and with which the microphone is accordingly controlled such that it is always directed onto the mouth of the user. When the operating arrangement is provided in a motor vehicle, it is advantageous to arrange the video camera in the area of the windshield and to align it onto the mouth of the driver in order to accordingly set the sensitivity maximum of the directional characteristic of the microphone toward the mouth.

In order to effectively implement the blind operation concept, an answer back arrangement is provided that advantageously exhibits an acoustic voice output. It is also advantageous that, given a number of operable devices, for example a motor vehicle and a telephone, a virtual image of the selected device is provided on a display.

In addition to comprising the voice output, the answer back arrangement can also comprise a visual display means, wherein the visual means can be arranged in the operating means but can also be arranged in the device to be operated.

The devices to be operated can thus be displayed with the visual display means, but symbolized operating elements of the operating means that can be operated by the navigator can also be displayed.

It is also advantageous when the visual display means presents the operating events at the devices in that the symbolized operating elements can be dynamically changed by the operation. The operating means that the navigator comprises can be a hand-held operating device, for example a handset for remote control, that can additionally comprise a chip set for legitimization functions or similar functions.

Such a handset employable for the remote control of the devices to be operated is advantageously expediently fashioned when the software required for the operation, which is normally contained in the device to be operated, is automatically loaded into the handset when this is employed for operating the device for the first time.

The navigator of the operating means, however, can also be implemented as a control field that is advantageously arranged in the proximity of the hand position of the user. This solution is particularly meaningful when used in a motor vehicle since the control field can be integrated, for example, into the steering wheel.

Further, the operating means can comprise a microphone with voice recognition means, which enables operation with the assistance of voice. It is then advantageous when the voice recognition means comprises different speech models adapted to the device to be operated.

The operating elements contained in the navigator advantageously enable movement in three dimensions that can be blindly distinguished by the operator. Keys, rollers, wheels and rotary knobs can be employed as operating elements. An operating means with a navigator is especially advantageous when the navigator has keys as operating elements, namely a key for voice and five operating keys, in which four keys form two directional key pairs perpendicular to one another and the fifth key can be employed for actuating a selection.

In order to implement a number of functions with few operating elements, it is advantageous to at least partially allocate multiple functions to individual operating elements. The selection of the functions can then be achieved, for example, in that a key is actuated for different lengths of time. An allocation of the operating elements to the devices can then be realized such that, proceeding from a selected device, a branch can be made on demand into arbitrary, lower levels, whereby a list of the available devices can be addressed on the highest level and functions and sub-functions of these devices can be addressed in the lower levels.

Particular advantages of the operating arrangement lie therein that the operating events have a simple logic which can be reproducibly reduced to operation with few operating elements or which can be imaged. The operation to of such a general input structure can be blindly undertaken after a short training phase when, for example, keys are used that have pronounced, tactile shapes or an arrangement that is easy to memorize and can be employed in many different situations and nonetheless exhibit similar or analogous effect. The object of the invention achieved via a display that is mainly a voice output but that can be supported by a visual display means.

The invention thus combines an intuitively and blindly operable navigator for manipulation of functions of the devices comprising, for example, a minimum keyboard or a voice input and answer back arrangement, realized as acoustic voice output or additionally realized as visual display means. Operation or use of one or more devices are thereby combined as virtual devices and are symbolically or texturally displayed on a display. As a result of this division into virtual devices, a number of physically separate devices can be successively operated with one operating device.

A further embodiment of the information display system is described in greater detail in the following paragraphs of the specification.

The invention also makes it possible that, with the assistance of video projection techniques, large display areas can be achieved for the costs of small displays. The brightness for the viewer can be enhanced with a back-projection display and/or a mirrored head-up display that can be darkened by using prescribable illumination beam paths and can become particularly effective by tracking the pupil, particularly in the eye of the observer.

It is advantageous to employ a projection display as an output display (A-DIS) with which the information is visualized either projected into the windshield (head-up display) or in the region of the dashboard. The windshield can be optionally equipped with reflection-enhancing and/or reflection-reducing layers at the surface portions required for the reflection. The projection display can be implemented as composed of a video display (for example, LCD display that can be illuminated from behind), a light source for the trans-illumination and an adjustment means for the display and/or the light source.

In a motor vehicle, for example, it is advantageous when the information display system contains a video back-projection that can be arranged in the space under the dashboard. Further, a projection screen, optionally of plastic or glass with medium or disappearing diffuseness, can be arranged in or at the dashboard and highly visible to the observer. The means for the back-projection itself can be composed of a lamp, a prescribably small video display and optical elements for enlargement that are arranged such that a real, enlarged image of the video display is cast from the small video display onto the projection screen.

Further, at least one prism that deflects the illumination beam path to the eye of the observer and/or one lens that focuses the light into eye of the observer can be arranged in the immediate proximity of the projection screen.

Optionally, the prism and the illumination lens can, respectively or in combination with the projection screen, be implemented as Fresnel prisms or Fresno lenses. It is advantageous when, given an appropriate roughening, they assume the function of the diffusion of the projection screen.

Mechanical or motorized adjustment means of the illumination source (lamp) or of the illumination beam path in general can be employed so that optimum view of the projection display can be guaranteed for observers of different sizes or when an observer changes his seating position.

Further, a mirror box can be employed that is bounded on all sides by walls and in which the projection display projects through an opening or transparent location of a wall and that uses the projection screen as a wall and that contains at least one mirror in the beam path. Alternatively, the projection display can also be located in the mirror box. A deflection means (mirror) can thereby be arranged in the mirror box such that the beams of the projection display are directed to the eyes of the observer (site tracker). Preferably, the deflection means is arranged close to the projection screen and is moved with mechanical or electromechanical drives. At least one tilting mirror or oppositely turned prisms can be employed as deflection means.

The illumination beam path can be balanced with the assistance of an image evaluation of the video camera and the described, adjustable deflection means such that it is incident into the eyes of the observer. A means for control can readjust the illumination beam path until the video camera identifies maximum brightness in the face.

It is also advantageous when a mirror having a curvature is provided in the mirror box preceding the projection screen. Dependent on the attitude, this mirror can thereby co-assume a part of the imaging properties of the imaging objective and/or of the light bundling. As a result of the curvature, the geometry of the beam path can be adapted better to the existing space given the same imaging conditions. The mirror can thereby either be concave close to the projection screen and, thus, already effect/simplify the light bundling onto the face of the viewer as a result of a correspondingly prescribable curvature or the mirror close to the projection screen can be convex and thus enabling a tight installation design. Given the convex mirror, it is advantageous to arrange a lens or a Fresnel lens that directs the light bundling into the face of the observer in the region of the projection screen.

The curved mirror can also advantageously be aspherical. A true-to-area imaging onto, for example, the windshield is thus initially foregone. However, the true-to-area imaging can be calculated by electronic pre-distortion on the video display. The distortion caused by the curvature of the windshield and dependent on the viewer's position can thus be compensated in that the video display presents a distortion inverse thereto and mirrors this into the windshield. Since a different distortion arises for every seated position of the observer, a different image must also be mirrored in from the video display for each seated position. It can also be advantageous to interpolate intermediate values. By observing the driver, the video camera supplies the necessary position coordinates, so that the image to be respectively displayed on the video display is correspondingly electronically distorted. The production of pre-distorted images can ensue by trials or can be calculated with CAD data of the windshield and beam path calculation programs.

An advantageous development of the information display system is comprised of a means for regulating the brightness of the video display, in that grey filters (neutral density filters) or polarization filters rotatable relative to one another are arranged to be pivoted in in order to absorb light. These filters are required when the electronic darkening of the light source is not adequate and the video display also does not allow any further darkening.

It is also advantageous when the illumination means, which is controllable in brightness, contains a secondary lamp in addition to a principal lamp, and that optical means are provided in the beam path such as, for example, a partially reflective mirror, that allows the two light sources to appear virtually as one light source. It is thereby advantageous when the principal lamp is the stronger lamp and its light is allowed to pass with priority by the partially reflective mirror. This principal lamp is employed given extremely bright scenes. Given dark scenes, for example at night, the prescribable more weakly illuminating secondary lamp can then be utilized. In the case of a malfunction of a lamp, the lamp that is still functioning can assume an emergency display function.

The information display system can advantageously contain a video camera above the windshield (as an example in a motor vehicle) that observes the viewer, particularly the face of the viewer. This illumination beam path can preferably be modified such that the light energy is incident into the eyes of the viewer. It is thereby advantageous that additional illumination can be eliminated and, for example, darkness prevails in the car except for at the circle of the face of the viewer of the information display system.

The brightness of the information display system can be advantageously automatically adapted to the brightness of the observed scene. Let it be noted that "scene" here means the traffic situation observed with reference to the example of an employment of the information center in the motor vehicle. The possibility of adjusting the brightness of the display elements regardless of a possibly existing, automatic brightness adaptation should be individually reserved for the viewer.

A reference surface that, for example, represents the face of the viewer or, on the other hand, the inside roof lining in the motor vehicle can serve in the automatic brightness adaptation of the scene to the viewer. The measurement of the brightness with a light meter or with the video camera itself is thereby advantageous. A distinction between natural light and light generated by ambient street light and the light deriving from the video projection can be undertaken by modulation and demodulation of the video light (frame-by-frame evaluation of the information supplied by the video camera).

The information display system can be advantageously composed of two separate projection displays, one for the projection onto the dashboards and one for the head-up display. Two separate projection displays have the advantage of redundancy given outage of one projection display.

On the basis of displaceable regions, the viewer can be offered the possibility of selecting between the information that the viewer wishes to see on the dashboards and/or on the head-up display. The displaceable unit is composed of a Fresnel prism for deflection and an illumination lens for bundling the illumination beam path.

It is also advantageous to employ a single projection display that, with a Fresnel prism/lens plate, nests the prism elements and lens elements required for beam deflection and focusing in both directions in alternation.

The projection display can be heated to operating temperature with a pre-heater unit.

A replacement illumination means is advantageous when the illumination means (lamp) fails. An automatic switching to the replacement illumination is also expedient.

When the readjustment means for monitoring the position of the face of the viewer of the information display system fails, then a standard setting must be selected for observing the projection display. This, for example, can be the position at which the driver of the motor vehicle has been most frequently located.

The employment of a readjustment means is also advantageous that is configured such that a mirror that bends the beam path is inserted between the light source and the video display. The adjustment of the mirror can ensue electronically or electromechanically in two axes. It can be expedient when the readjustment means does not proportionally level every minute change in position; rather, readjustment is only carried out given the occurrence of a prescribable deflection amplitude, for example movement of the viewer by more than half the viewer's head width. The service life of the motor operators is thus enhanced.

It is also expedient when means are provided that can electronically shift the image on the video display such that an optimally large portion of the image is offered to the viewer, even given a great change in the viewer's position. The video display can thereby be realized as overdimensioned, so that a medium position of the image is projected into the field of view during normal operation. When the viewer then changes in position, the image on the display can be electronically shifted such that the illumination beam path still always visibly displays the entire image to the viewer. When the viewer moves beyond the limit that is still possible to allow the complete presentation of the image for the viewer by shifting the image on the video display, then the image can be electronically further modified, for example made smaller, so that the viewer is still offered the complete information. This embodiment of the information display system achieves the same effect as though the projector were being displaced, so that the viewer can continue to follow the illumination beam path. The electronic movement of the image on the video display (scrolling a reduced image on the video display) thus corresponds to a virtual projector.

One embodiment of the information display system is comprised in providing of a multi-media environment in rows of seats such as, for example, found in a bus, train or airplane. A multi-media means is integrated into the back rest of the seat in front of the user.

A "multi-media seat" is composed of a chair with seating surface and back rest. An arrangement of multimedia seats provides a further chair standing in front of the chair, whereby the seating surfaces in the chairs of a first row can be eliminated and the back rests in a last row can be implemented simplified. The back rests of preceding chairs have video presentation capability, as needed, have additional components such as a loudspeaker, a headphone, a microphone, a video camera and further interaction elements such as, for example, a mouse, a keyboard, a track ball, a pin, a touch pad, a zap navigator, a virtual duck screen and an interface with a fixed cable plug connection, infrared or radio with individual addressing capability for each chair.

Advantageously, the video presentation capability is implemented like the above-described output display.

When a video camera is part of the multi-media seat, then the video camera, as disclosed in the case of the information display system, will track the face of the viewer in order to assure that the light for the image to be presented is incident to the viewer's eyes. Further, as described, a microphone lobe can track the mouth of the speaker.

Further, at least one loudspeaker can be integrated in the ear area of the multi-media seat, whereby, given the presence of a number of loudspeakers for viewers differing in size, the correct loudspeaker can be selected with the assistance of the video camera.

Individual communication via DECT and/or GSM in each multi-media seat is a further advantageous application.

Another embodiment of the invention combines a number of display devices to form a unit. Thus, a first display means located, for example, in the dashboards and that can be fashioned as a traditional display or as a back-projection display can be combined with a second display means that is projected into the dashboard of a motor vehicle in the form of a projection display, for example as a head-up display. The combination is thereby expediently comprised therein that the first and the second display means can be selected and used as a unit.

Advantageously, the invention can be developed such that the head-up display is implemented as variable in size. Thus, a finite list composed of telephone numbers from which the driver wishes to select a specific name can be displayed in the combined display means. When further possibilities are available for selection, the desired term from the displayed list is selected with a prescribable input unit. It is thereby possible to present the most probable hit of a search for the desired term at the head of the list, i.e. in the head-up display, and as optimally as possible in the field of vision of the user, by contrast improbable hits in the search are displayed farther toward the bottom, for example in the back-projection display.

Advantageously, the head-up display can thereby be used in order to flexibly present a variable-size region in the field of view of the user.

In the specific example, when driving a motor vehicle, the invention is embodied as a combination of traditional display devices in the dashboard, whereby these can also be optically projected, and of a head-up display that is projected into the region of the windshield and is variable in size.

As already indicated above, the information can be presented prioritized on the combined display units, whereby high-priority information are brought farther into the field of vision of the user. What is thereby assumed to be the field of vision is the angle of view that results from the user observing the traffic situation.

An advantageous embodiment of the invention is comprised in fashioning the first part of the arrangement exactly as wide as the second part of the arrangement, so that the unit of the combined display means is conveyed at first sight. Moreover, the two parts of the arrangement are implemented wider than high, whereby the second part of the arrangement (the head-up display) is variable in height.

It is also advantageous when a bright background is selected for the first part of the arrangement for the presentation of characters and/or symbols.

DESCRIPTION OF THE DRAWINGS

FIG. 31 is an illustration that shows the illumination beam path for a centering onto the eyes of the viewers.

FIG. 32 is an illustration that shows the illumination beam path for a centering onto the eyes of the viewer, wherein a tilting mirror is employed.

FIG. 34 a sketch that shows a variable-size head-up display.

DETAILED DESCRIPTION OF THE PRESENTLY PREFERRED EMBODIMENTS

Figure 1A:
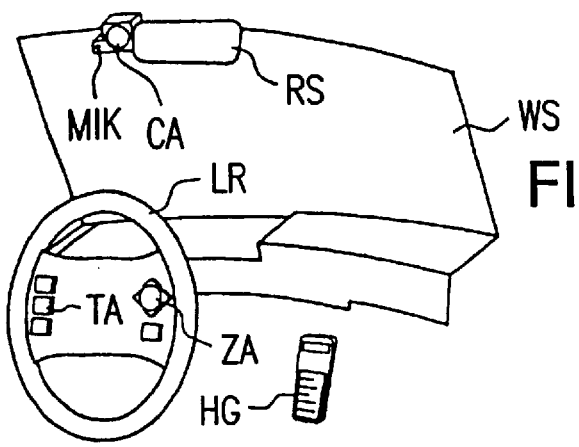
FIG. 1a is an illustration of an embodiment of the information display system employed in a motor vehicle and in its closed position.
Figure 1B:
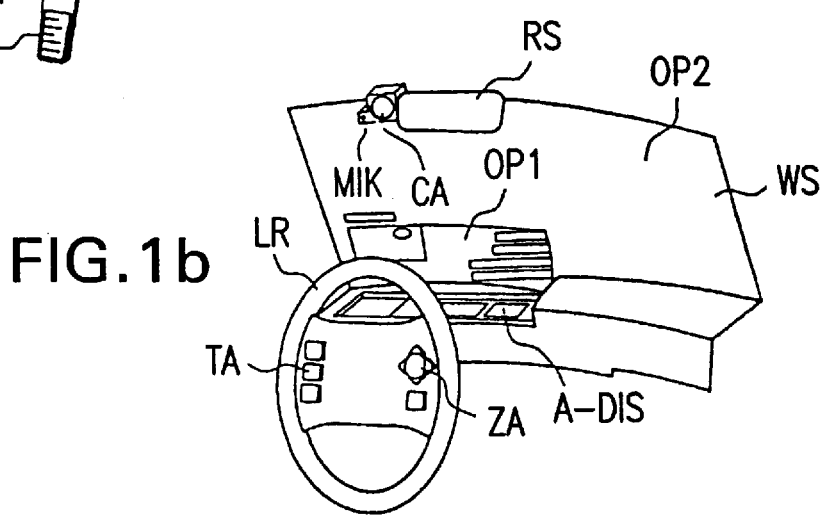
FIG. 1b is an illustration of an embodiment of the information display system employed in a motor vehicle and in its operating position.

The information display system according to FIGS. 1a and 1b, which shows the employment of the invention in a motor vehicle as an example, comprises an output display A-DIS on which a presentation of information to be displayed is generated, a first optical means OP1, for example a concave mirror, with which light rays output by the output display A-DIS are mirrored into the direction of view of the driver, a second optical means PP2 realized, for example, as pane WS, in which a virtual image of the presentation is generated, and operating arrangements in the steering wheel LR implemented, for example, as an input unit ZA or as a handset HG. Further, a video camera CA and a microphone MIK are arranged next to a rearview mirror RS. With the assistance of the video camera CA, for example, the position of the mouth of the driver or of the eyes of the driver can be identified in order, for example, to control the mirroring of the presentations into the direction of view of the driver or in order to always align the microphone MIK directly onto the mouth of the driver.

Figure 2:
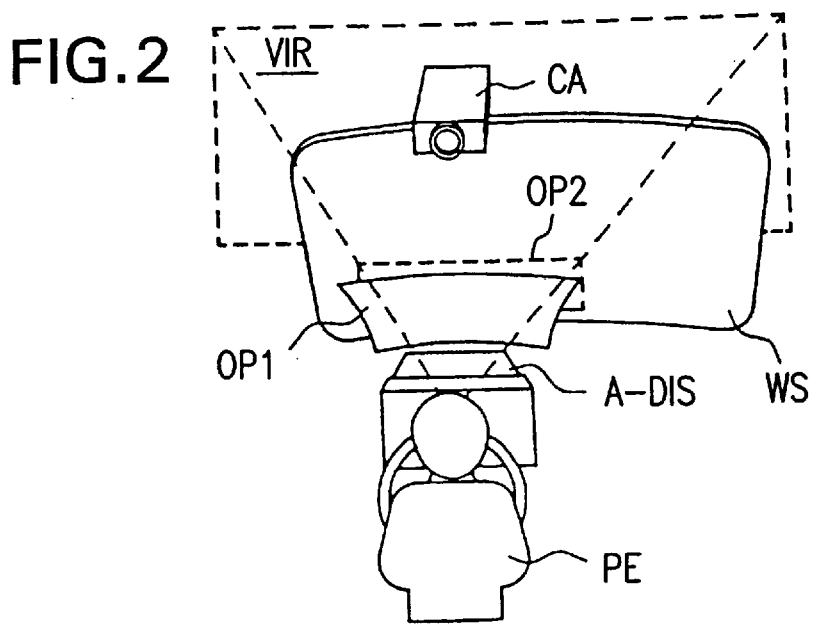
FIG. 2 is a schematic illustration of the information display system employed in a motor vehicle, viewed from above.
Figure 3:
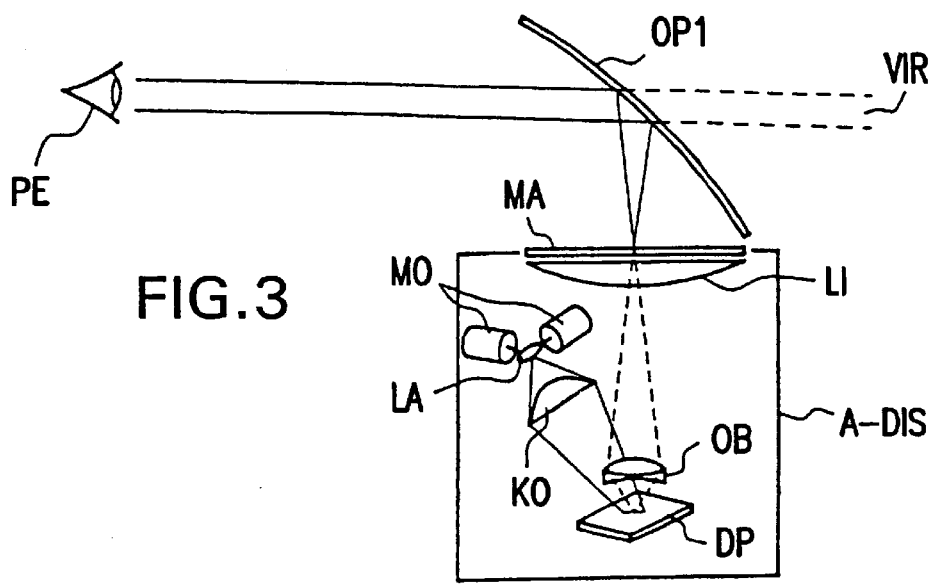
FIG. 3 is a schematic illustration of the information display system with output display, first optical means and second optical means, illustrating how the presentation is mirrored into the direction of view of the user.

The information display system is shown in greater detail in FIG. 2 and FIG. 3. According to FIG. 2, the output display A-DIS is arranged in front of the person PE, the driver, and generates presentations of the information to be displayed. These presentations are projected into the direction of view of the driver by the first optical means OP1, for example a concave mirror, and appear on the second optical means OP2 as virtual image of the presentation. The second optical means OP2 is realized as a windshield WS in the exemplary embodiment.

FIG. 3 shows more clearly how, for example, the output display A-DIS can be realized. This can be composed of a display DP, for example, a multi-mirror chip, that is illuminated with light deriving from a lamp LA and that is directed onto the display DP by a condenser KO. The position of the lamp LA can be varied with the assistance of motor actuators MO. The light emanating from the display DP is bundled with the assistance of an objective OB, goes through an illumination lens LI, also proceeds through a matte pane MA to the first optical means OP1, for example, an occular mirror, and proceeds from the latter in the direction of view of the person PE who sees the presentation as a virtual image VIR in, for example, the windshield WS (FIG. 2).

Figure 4:
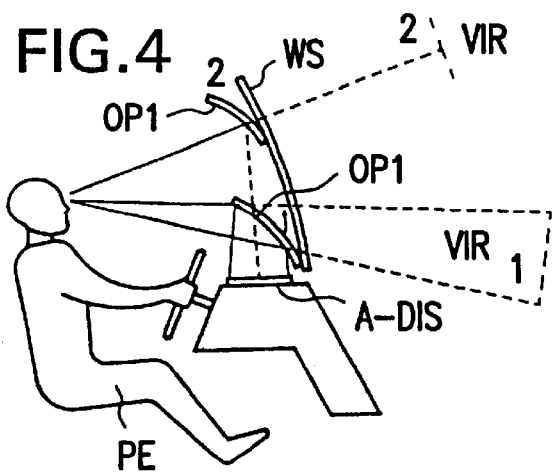
FIG. 4 is a side view of the information display system illustrating generation of the virtual images of the presentations at different locations of the windshield in a motor vehicle.
Figure 5:
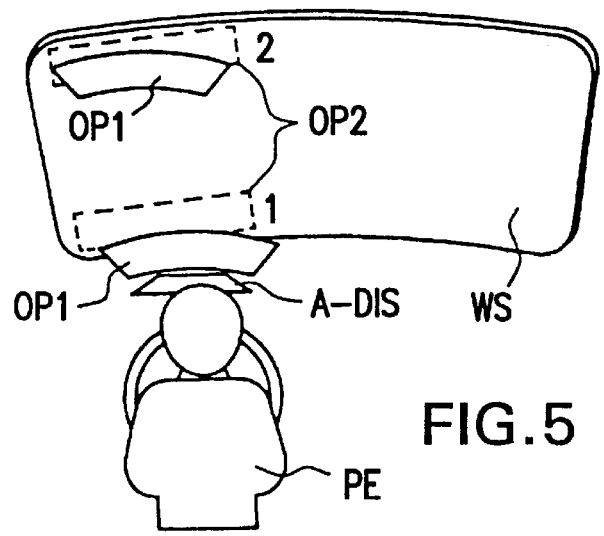
FIG. 5 is an illustration of the information display system illustrating further locations at which virtual images can be generated.
Figure 6:
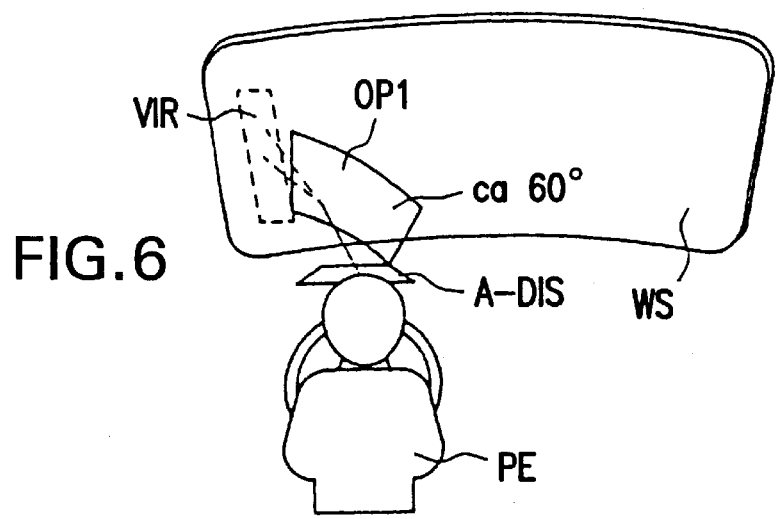
FIG. 6 is an illustration of the information display system illustrating further locations at which virtual images can be generated.

According to FIG. 4 and FIG. 5, the location at which the virtual images VIR are generated with the assistance of the second optical means OP2 can be defined at the upper edge 2 or at the lower edge 1 of the windshield WS, whereby the different location of the virtual images VIR is determined by a different attitude of the first optical means OP1, for example the concave mirror. According to FIG. 6, it is likewise possible to generate the virtual image VIR at the lateral edge of the windshield WS, again produced by the attitude and the arrangement of the first optical means OP1.

Figure 7:
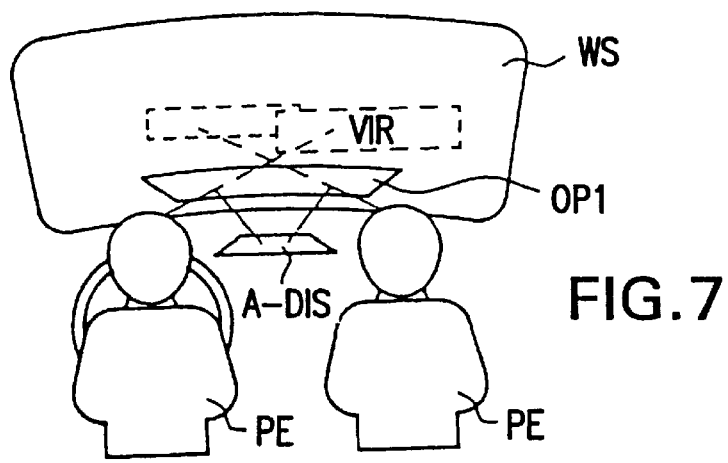
FIG. 7 is an illustration of an example of the case wherein a number of persons can simultaneously view the virtual images, for example when the invention is used in a motor vehicle.

It can be advantageous that it is not only one person who can view the virtual image but a number of persons. FIG. 7 shows an example wherein two persons PE can observe their true images that, for example, are generated in the windshield WS of a motor vehicle. It is thereby possible to generate a separate virtual image VIR of a presentation of an information for each person PE or a virtual image VIR for both persons controlled by one person PE. It is thus possible that, for example, the passenger calls the information for the driver with an operating arrangement, so that the driver is not burdened with the operation of the information display system.

Figure 8:
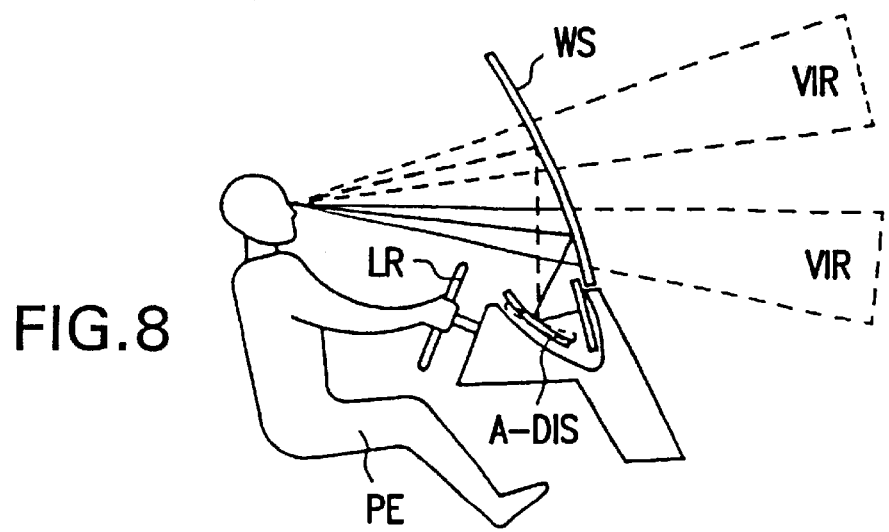
FIG. 8 is an illustration of an exemplary embodiment of the information display system, wherein the output display steerable.

FIG. 8 shows another exemplary embodiment with which different locations of a virtual image VIR can be generated. Here, the output display A-DIS is pivotably arranged, with the result that virtual images VIR can arise at different locations of, for example, the windshield WS.

The first optical means OP1 can, for example, be a concave mirror; however, it can also be part of the windshield WS which must then be appropriately mirrored. The first optical means OP1 must, in any case, be a means with which the light rays emanating from the output display A-DIS are mirrored into the direction of view of the person PE and, moreover, must be implemented partially transparent so that a virtual image VIR can be generated for the person PE.

Figure 9:
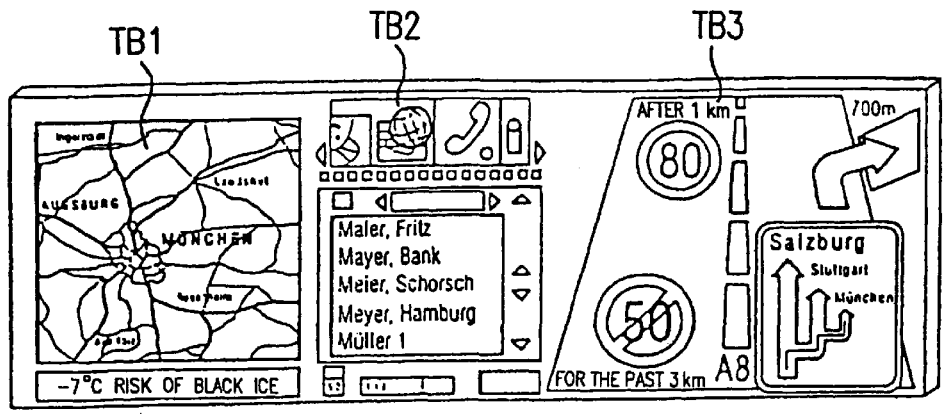
FIG. 9 is an illustration of a possible presentation on the output display and the virtual image that is composed of a number of sub-areas.
Figure 10:
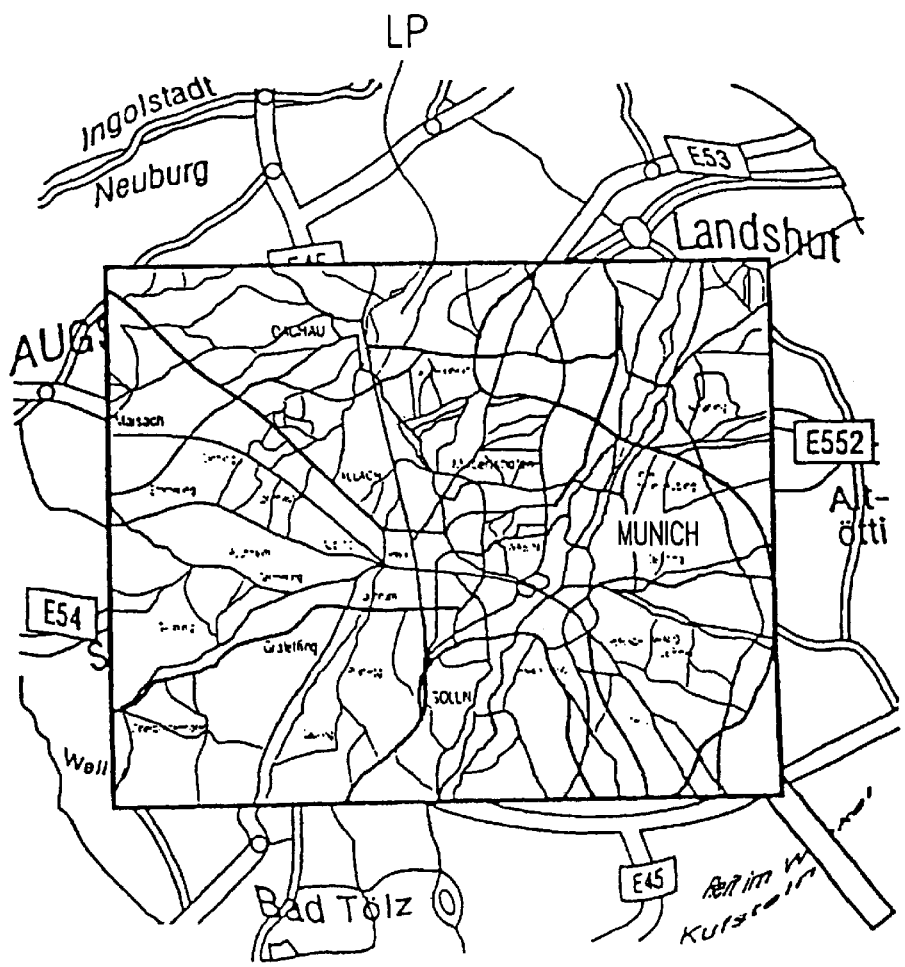
FIG. 10 is an illustration of a possible presentation of a map as a virtual image.

FIG. 9 shows what a presentation generated by the output display A-DIS can look like. Such a presentation of information can be composed of various sub-areas TB1, TB2, TB3. A first sub-area TB1 can represent an excerpt from a map; a second sub-area TB2 can show a number of operable devices; and a third sub-area TB3 can represent a portion of a street with directional indications and signposts. For example, the map TB1 can be generated as a virtual image VIR the way it is shown in FIG. 10. There, the map is first shown as a spherical map and a central area of this map is shown magnified with the assistance of a magnifier LP.

Figure 11:
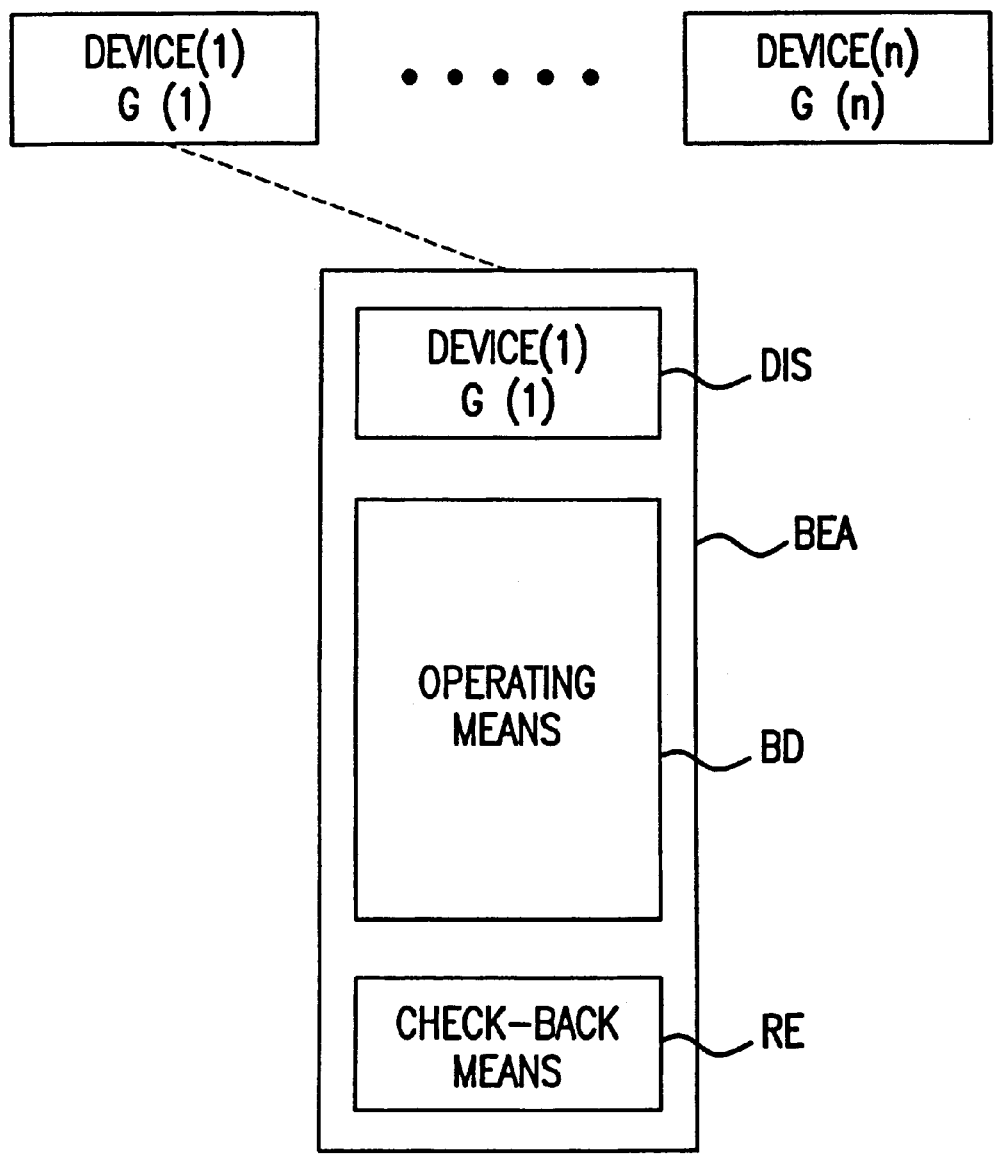
FIG. 11 is a schematic illustration of the operating arrangement.

FIG. 11 generally shows an arrangement for operating a number of devices G(1) through G(n), for example, a motor vehicle and a telephone or other devices as well units of devices or their functions. The operating arrangement for these devices G(1) through G(n) is referenced BEA. The arrangement BEA enables the virtual imaging of a device G(1) that has been selected at the moment in a display DIS and comprises an answer back arrangement RE and an operating means BD that contains a navigator (not shown). One of the devices G(1) through G(n) can be selected in that the operating means BD is correspondingly operated. When a device G(1) through G(n) has been selected, for example, the device G(1), then it is presented on the display DIS and the user is informed of the selection of the device G(1) via the answer back means RE.

Figure 12:
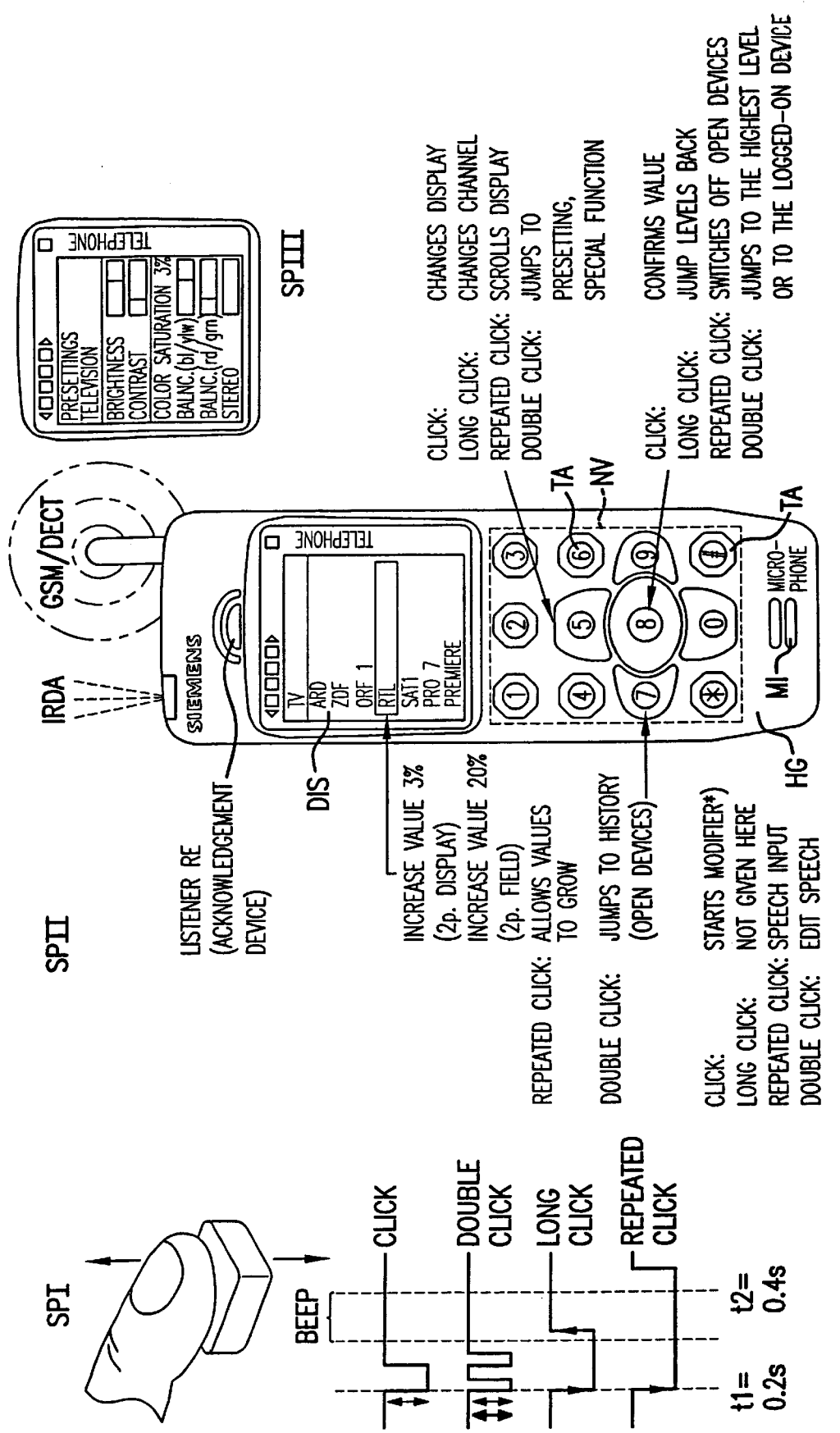
FIG. 12 is an illustration of an embodiment of the operating means as a handset.

A possible embodiment of the operating means BEA can be derived from FIG. 12. The operating means is realized therein as handset HG. It can be seen that the display DIS, as an example, enables the selection of various television stations that are virtually presented thereat as text. An operating means BD is also provided that is composed of keys TA and what is referred to as an input unit ZA. The keys TA, but, in particular, the input unit ZA are then the navigator NV with which a selection can be made from among the devices. The connection to the devices can be produced via infrared rays or via other remote control methods. GSM/DECT methods are indicated by way of example in FIG. 12.

The handset of FIG. 12 also enables an input with the assistance of a microphone MI, so that an operation of the device is also possible without keys TA. The answer back arrangement, an earphone, is referenced H_RE. When the corresponding device has been selected, this can be displayed on the display DIS and the selected device can be additionally acoustically reported with the assistance of the answer back arrangement RE.

Figure 13:
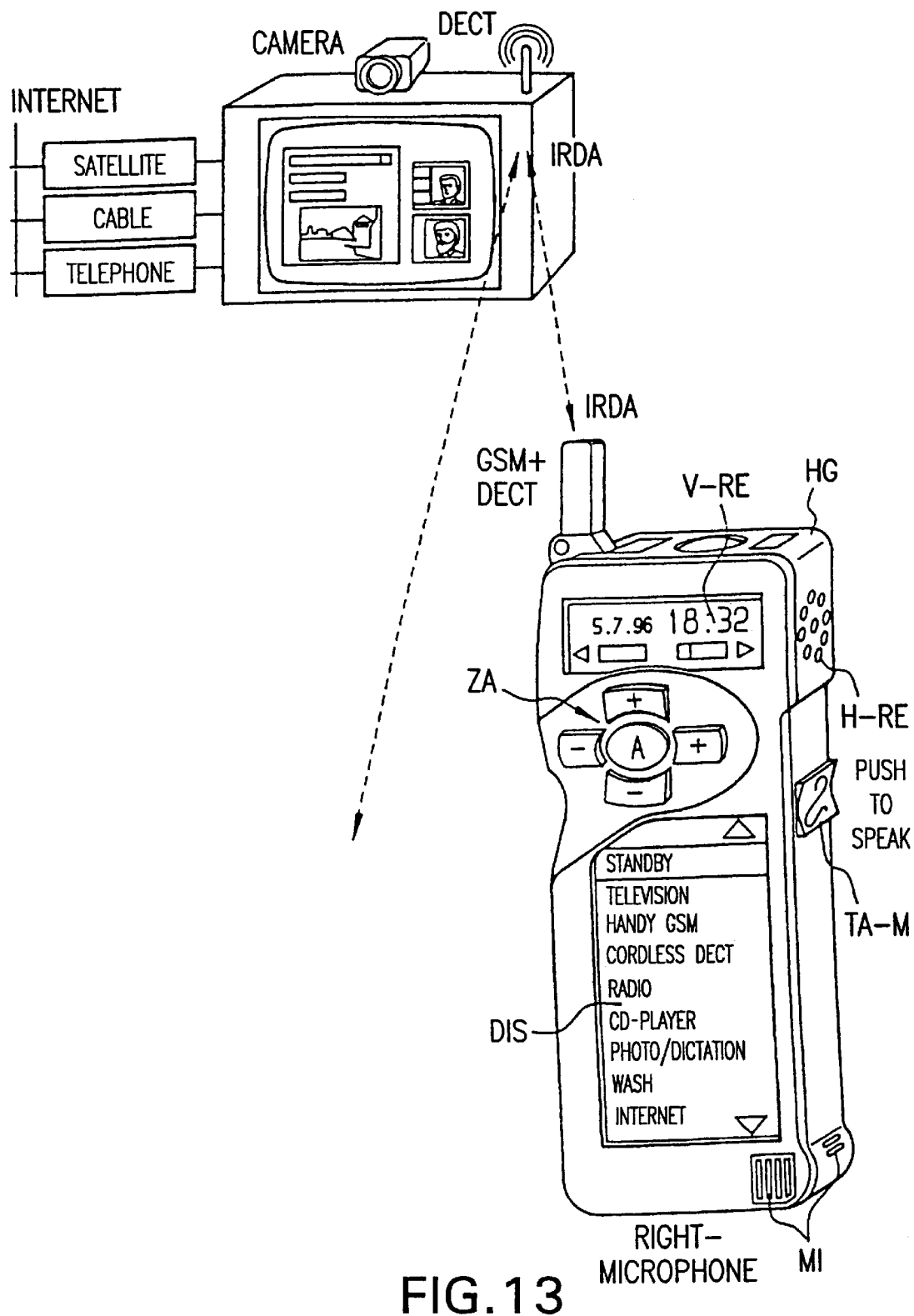
FIG. 13 is an illustration of a second embodiment of the operating means as a handset.

FIG. 13 shows a further embodiment of a handset HG. The handset HG comprising a display DIS, an input unit ZA as navigator of the operating means and answer back arrangements RE that, in addition to containing an earphone H_RE, can contain a visual display means V_RE. A microphone MI can likewise be employed for inputting the operating events, so that the zap cross could also be forgone.

Figure 16:
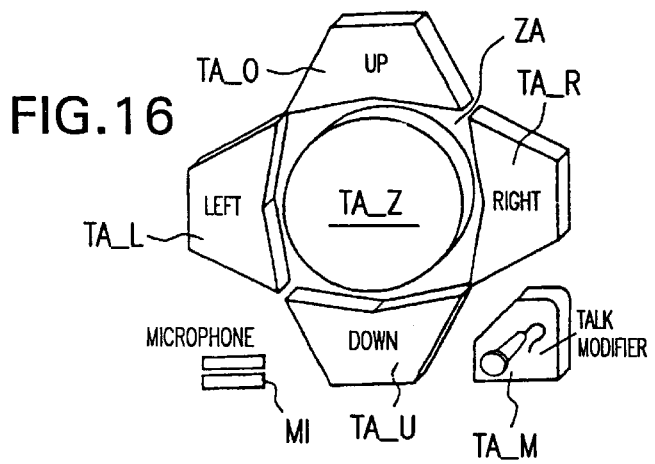
FIG. 16 is an illustration of a first embodiment of the navigator.

A structure of an input unit ZA is shown in FIG. 16. It can be seen here that the operation of the devices can be undertaken with five keys, wherein two key pairs TA_R, TA_L and TA_O, TA_U are perpendicular relative to one another and one key TA_Z lies centrally within the two key pairs. For example, one of the devices can be selected with the assistance of the key pair TA_O, TA_U, these devices being shown on the display DIS in FIG. 13. For example, functions can be selected with the assistance of the key pair TA_R, TA_L. The confirmation of the input is executed with the central key TA_Z.

FIG. 16 shows that a further key TA_M can be additionally provided next to the input unit ZA, a voice input, for example, via the microphone MI being capable of being activated therewith. The further key TA_M can also be arranged at some other location, see FIG. 13.

Figure 14:
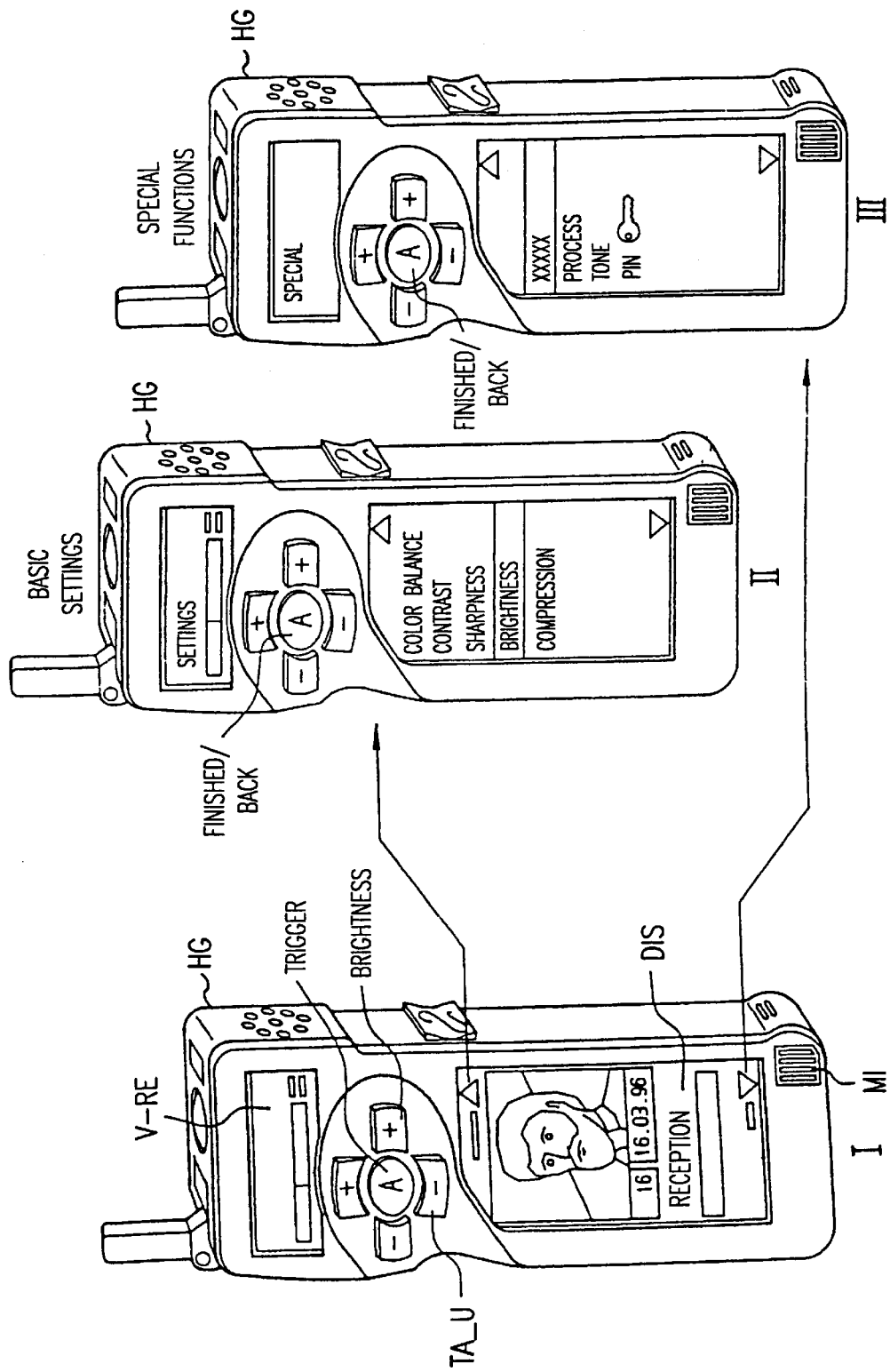
FIG. 14 is an illustration that shows how the various settings proceeding from an upper level can progress into lower levels.

FIG. 14 shows that various settings are possible with the handset HG, whereby a switch can be made from an upper level that is allocated to the individual devices in FIG. 13 into lower levels of functions and sub-functions of a selected device. The example of FIG. 14 presumes, for example, that a photographic device is operated with the operating arrangement. In this case, what is to be done with the photographic device, for example, a photograph should be reproduced, can be displayed in the display DIS with the handset HG. The setting of the handset HG ensues with the input unit ZA, namely, for example, with the key TA_U. The photograph to be presented is displayed on the display DIS. Further settings can then be triggered with the input unit ZA. For example, the brightness can be set via the key TA_R of the input unit ZA, this then being displayed on the visual display means V_RE. Or a special function can be set, namely the panning of a photograph, using a different key of the input unit ZA. Three settings I through III are thereby shown in FIG. 14 and show how this can be achieved. The selection of the individual functions, of course, can also ensue by voice via the microphone MI.

Figure 15:
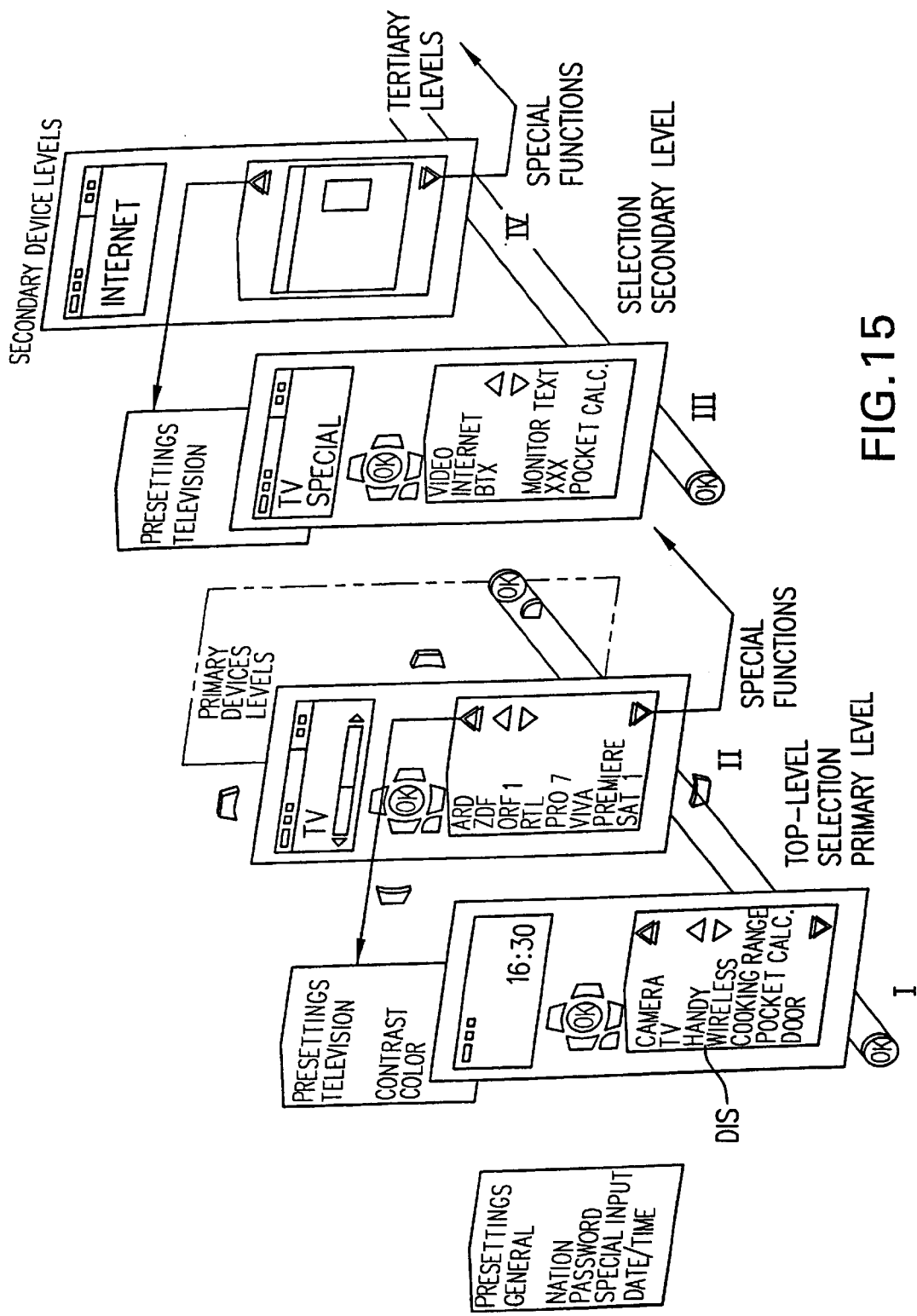
FIG. 15 is a second illustration of the multi-level concept.

A further example of the multi-level concept can be derived from FIG. 15. This shows the operating arrangement in four different settings. In the first setting 1, which devices are selectable is indicated on the display DIS. The device "television" can be selected with the assistance of the input unit ZA, for example, with the key TA_U, namely by pressing the central key TA_Z. When the device "television" has been selected, then a listing of the stations that can be addressed appears on the display DIS and the selected device appears on the visual display means V_RE. With the assistance, for example, of the keys TA_R, TA_L, one of the stations, for example, ZDF, can be selected after confirmation by the central key TA_Z. This setting is shown by 11.

Finally, a special function can be selected by actuation of the input unit ZA or of an additional key. Such special functions are shown in setting III. A function can be selected with the input unit ZA from the functions indicated in the display DIS, this deriving from setting IV.

The multi-level concept of FIG. 15 thus shows the path from the selection of a device to the selection of a special function that is to be implemented with the selected device. The selection respectively ensues via the input unit ZA, namely with the key pairs TA_R, TA_L and TA_O, TA_U, and confirmation by the central key TA_Z. Of course, all selection procedures can also ensue with the assistance of a voice input via the microphone MI.

As the Figures show, an earphone H_RE is employed. This can be supplemented by a visual display means V_RE. Via the microphone MI, it is also possible to realize an operating input with voice. The navigator NA manages with a minimum concept of easily remembered input elements, namely keys. It is thereby adequate to employ six easily remembered operating elements that can be distinguished by touch.

The Figures also show that all of the devices with their functions can be more easily operated in that the operating outlay is resolved into sub-tasks. Graphic, visual operating scenes are presented on the display DIS for the sub-jobs and the only thing that is also shown is what is required at the moment of operation.

As FIG. 16 shows, the navigator NA manages with three cognitive dimensions that are selectable with the operating elements, the keys. An x-y level of the presentation of virtual devices and the tabular presentation of parameters the depth classification or detailing according to the hierarchic principle, and the reminder sequence of the time succession of the processed events and events to be processed can thereby be distinguished. For example, the visual dimensions, the x-y-plane, can be allocated to the key pairs TA_R, TA_L or TA_O, TA_U; actuation into the detailing depth can be achieved with the central key TA_Z, whereby the way back can be achieved by a correspondingly long actuation of this central key TA_Z. The depth development or detailing thereby ensues according to the multi-level concept that is shown in FIG. 15. Finally, the chronological use succession or reminder succession can likewise be achieved, for example, by the horizontal key pair TA_L, TA_R. With the assistance of voice, it is possible by itself or in addition to directly run through a number of these levels with a chain of key word or even with a single user-defined special word and to arrive at the goal without manual navigation.

Operation without visual contact is enabled by the voice answer back. It is expedient to employ the input unit ZA according to FIG. 16 as navigator since one manages here with the minimally required six tools or keys. Even though this low number of operating elements seems too low for the number of operating jobs, it is adequate for the inventive operating concept. Inventively, namely, multiple functions can be allocated to these six basic operating elements, as shown in the Figures. The multiple functions can be selected such that the operating elements have a recurring significance in different operating situations allocated to them.

As FIGS. 12 through 15 show, a number of different real or virtual devices can be listed on the display DIS at the uppermost level or primary level, for example with text or symbolically with an icon and, for example, can be keyed through with a vertical key pair TA_O, TA_U and can be triggered with the central key TA_Z. A new operating level, the device level, is thus achieved with the central key.

The respective device with its operating elements can also be illustrated on the display DIS on the device level, whereby the horizontal key pair TA_L, TA_R can be used for the control of an important, specific function such as, for example, volume and the vertical key pair TA_O, TA_U can be mainly used for through-connection of text fields such as, for example, TV channels or telephone subscribers, and the selection of the corresponding function ensues with the central key TA_Z. Special functions that are more rarely required are opened up, for example, via a uniform operating step of double click, as shown, for example, in the left-hand column SPI in FIG. 12. For example, one respectively proceeds into a new device level with the central key TA_Z, whereby a branch back ensues, for example, with a long actuation of the central key TA_Z, see column SPI. For example, a double click on the central key TA_Z can lead directly to the primary selection level, see column SPI.

As FIG. 12, column Sri, shows, it is thus possible to proceed from one level to another and back or to address different functions within a level with different duration of the actuation of, for example, a key or with repeated operation of a key. The respectively addressed level and the respectively addressed function thereat can be displayed on the display DIS, whereby an additional visual display means $V_{\_RE}$ can also be employed for the answer back.

Figure 17:
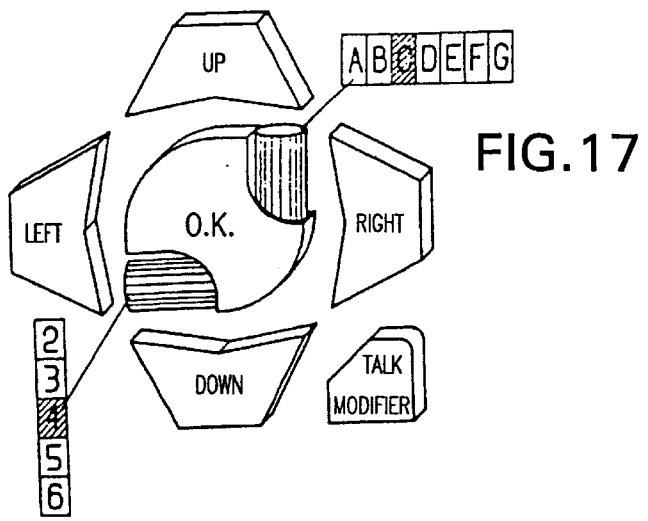
FIG. 17 is an illustration of further embodiments of a navigator.
Figure 18:
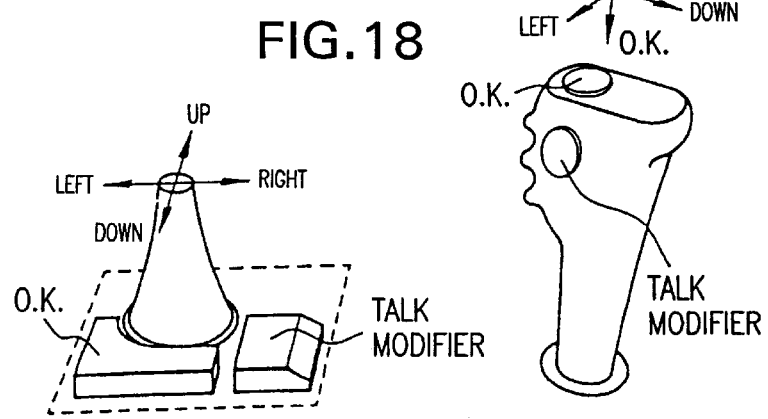
FIG. 18 is an illustration of further embodiments of the navigator.

In addition to the realization of the navigator NA with an input unit ZA, of course, there can also be other realizations as shown, for example, in FIG. 17 and FIG. 18. Thus, for example, rotary knobs, wheels, rollers, control sticks or similar operating elements can be employed. Given these realizations of the navigator NA, too, functions can be implemented according to the multi-level concept of FIG. 14. For example parallel functions and multiple functions can be allocated to an input element on the basis of a combination of keys and wheels.

FIG. 12 shows an exemplary embodiment of how the selection of devices and different functions of these devices can ensue with actuation of keys, particularly of the input unit ZA, and additional keys, whereby one can proceed according to the multi-level concept of FIG. 15. The relationships of the actuation of the key to key functions recited in FIG. 12 in columns SPI, SPII, SPIII are only recited by way of example; other allocations of key functions to the actuation of the keys is, of course, possible.

Figure 19:
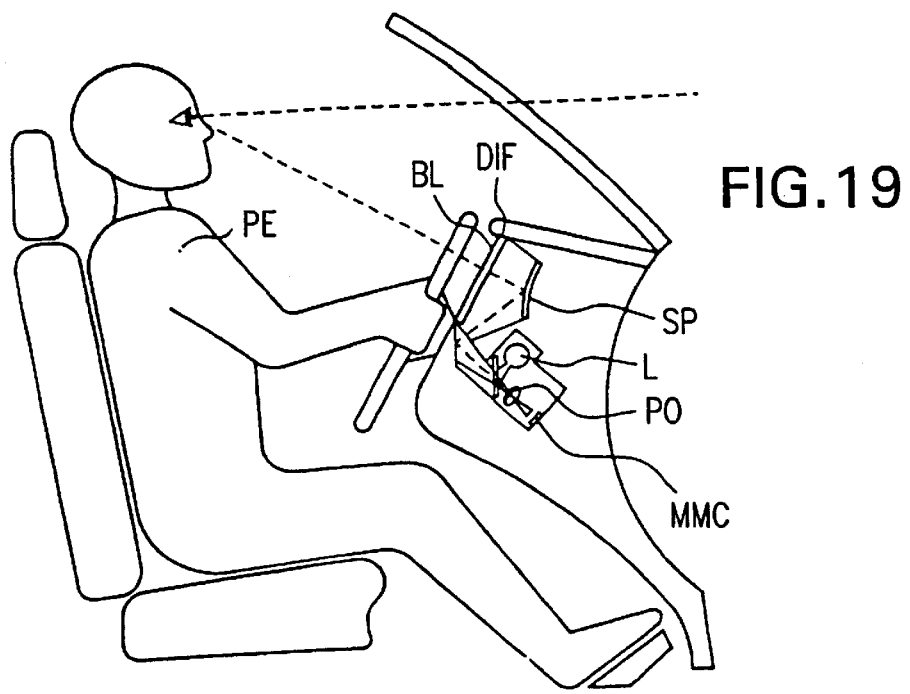
FIG. 19 is an illustration that show the video back-projection of the projection display.

A driver PE in the motor vehicle is schematically shown in FIG. 19. A real image is thereby displayed on a diffuser DIF in the dashboard by video back-projection. An illumination lens BL preceding the diffuser DIF assures that the projected image is offered to the viewer with appropriate brightness and sharpness. A projection display is composed of a video display MMC, a lamp L and a projection objective PO. The video display MMC is illuminated with the lamp L and is cast with the projection objective PO onto an optical means SP for the deflection of the beam path.

Figure 20:
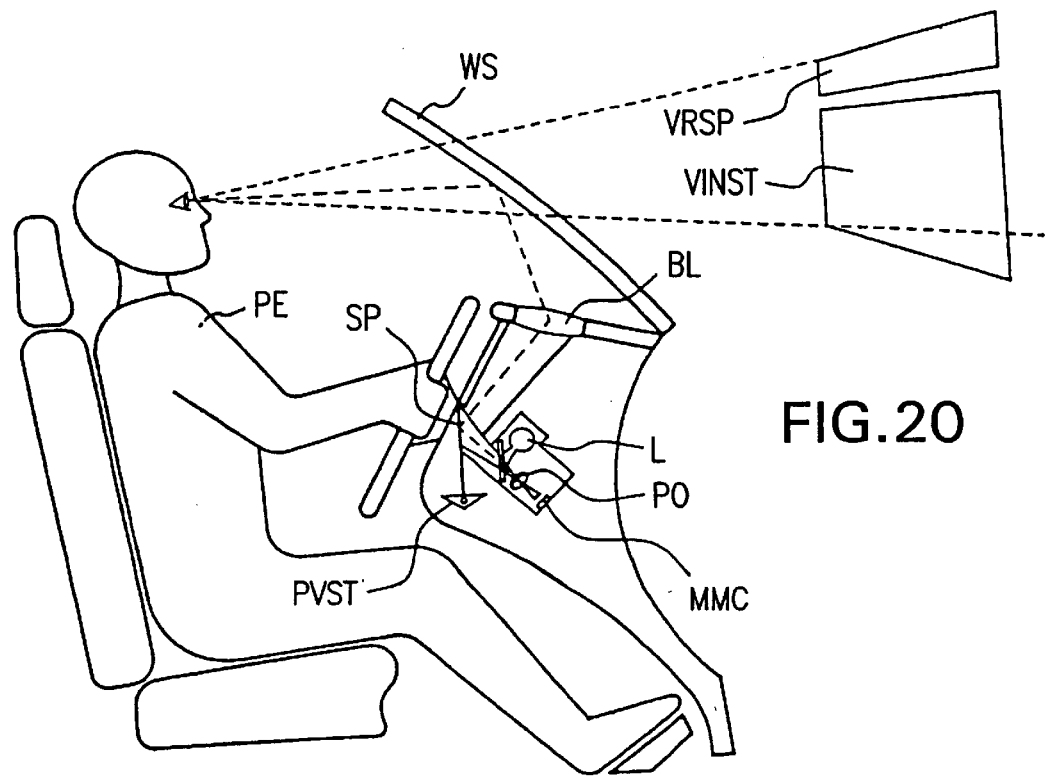
FIG. 20 is an illustration that shows the video back-projection into the windshield (head-up display).

In FIG. 20, an image that, when viewed, no longer requires the eyes to be averted from the traffic situation is projected into the windshield WS for the driver PE on the basis of video back-projection. This virtual instrumentation VINST, as well as the virtual rearview mirror VRSP can be respectively adjusted in position or in combination with the position adjustment PVST. Otherwise, the arrangement is as shown in FIG. 19.

Figure 21:
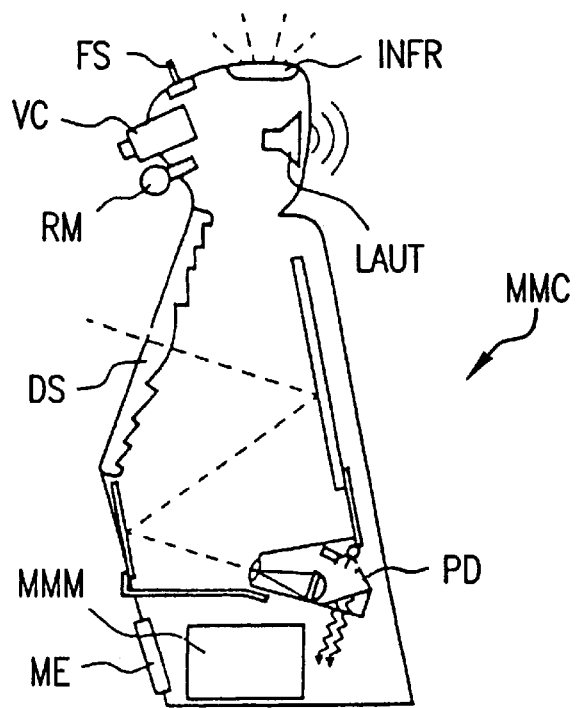
FIG. 21 is an illustration that outlines a multi-media seat.
Figure 22:
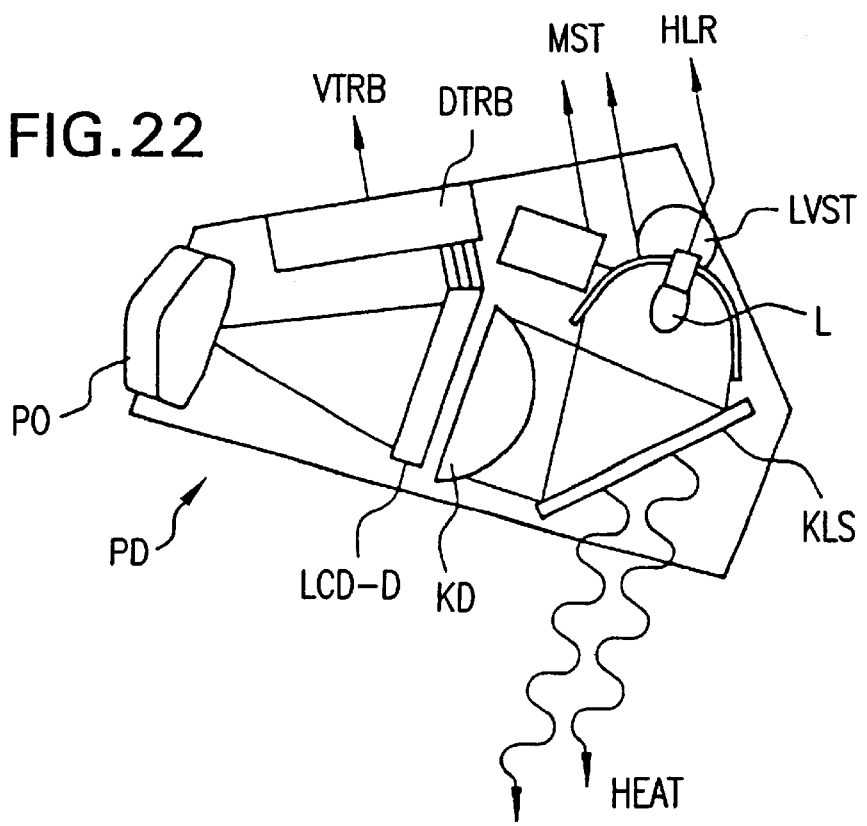
FIG. 22 is an illustration that shows a video display.

FIG. 22 shows a projection display PD that is contained by way of example in a "multimedia chair MMC" in FIG. 21. This projection display PD is likewise utilized in a motor vehicle. FIG. 21 shows the backrest of the multimedia chair MMC in which a video camera VC, a directional microphone RM, a display screen DS, a manual input device ME, at least one loudspeaker LAUT, an infrared interface INFR, a GSM/DECT radio interface FS, the projection display PD and a multimedia motherboard MM are contained. An image is presented to the viewer via the display screen DS via a prescribable beam path. The video camera VC together with the directional microphone RM and the loudspeaker LS make it possible for the user of the chair to enjoy multimedia applications such as, for example, video conferencing (via DECT/GSM interface) or Internet. The user can interact via a manual input interface ME separately provided therefor. The multimedia motherboard MM is specifically designed for the applications provided in the chair MMC and is based on standard hardware.

Figure 23:
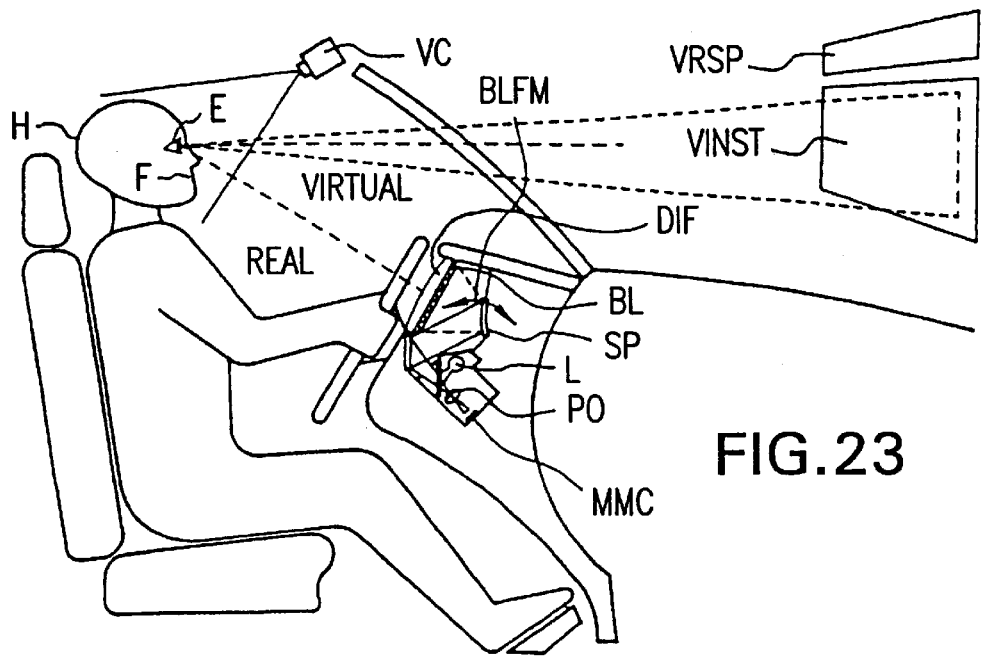
FIG. 23 is an illustration that shows the combination of virtual head-up display and back-projection display.

As mentioned above, FIG. 22 shows the projection display TD in detail. A lamp L is thereby provided adjustable via a lamp adjustment LVST that is implemented by a motor controller MST. The brightness of the lamp L can be set with a brightness regulator HLR. The light emerging from the lamp L is deflected onto a condenser KD by a cold light mirror KLS and is then incident onto the transilluminatable LCD display LCD-D that is driven by specific display drivers DTRB and video drivers VTRB. Finally, the imaging beam is incident onto the projection objective PO and leaves the projection display PD. FIG. 23 shows the combination of FIG. 19 and FIG. 20 with expansions. The virtual head-up display VINST/NRSP and the real, back-projected image are thus displayed combined on the diffuser DIF. The driver PE can thus decide which presentation he prefers or which information he wishes to see on which display VINST/NRSP. Further, the head-up display can be darkened. In addition, a site-tracking motor BLFM is also present that enables the adjustment of the mirror SP. The position of the head-up display VINST/NRSP is thus always adapted to the driver. The illumination beam path of the respective projection display PD is directed onto the eyes E of the driver PE. A means for following-up the mirror SP is implemented such that the position of the head H of the driver PE is monitored with a video camera VC and the mirror SP is correspondingly tilted given a change, so that the illumination beam path is again centered onto the eyes E of the driver PE. A means for regulating the brightness of the projection display is implemented such that the video camera VC uses the driver's face F as reference surface for determining the brightness and regulates the brightness of the projection display PD to a prescribable value corresponding to the brightness of the environment.

Figure 24:
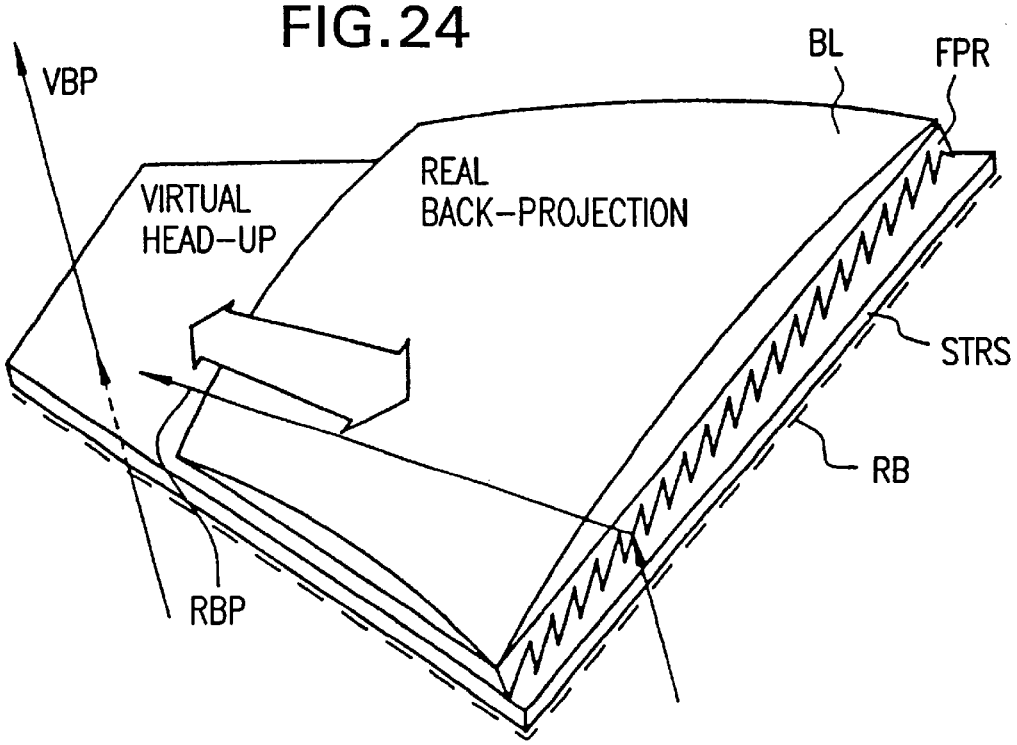
FIG. 24 is an illustration that shows the displaceable unit of a Fresnel prism and illumination lens.

FIG. 24 shows a displaceable unit composed of a Fresnel prism FLPR for deflection and of an illumination lens BL for focusing the illumination beam path. The areas that are covered by the displaceable unit form the back-projection display RBP; the non-covered areas are parts of the head-up display VBP. The real image RB is imaged on a low-opacity diffusor pane STRS.

Figure 25:
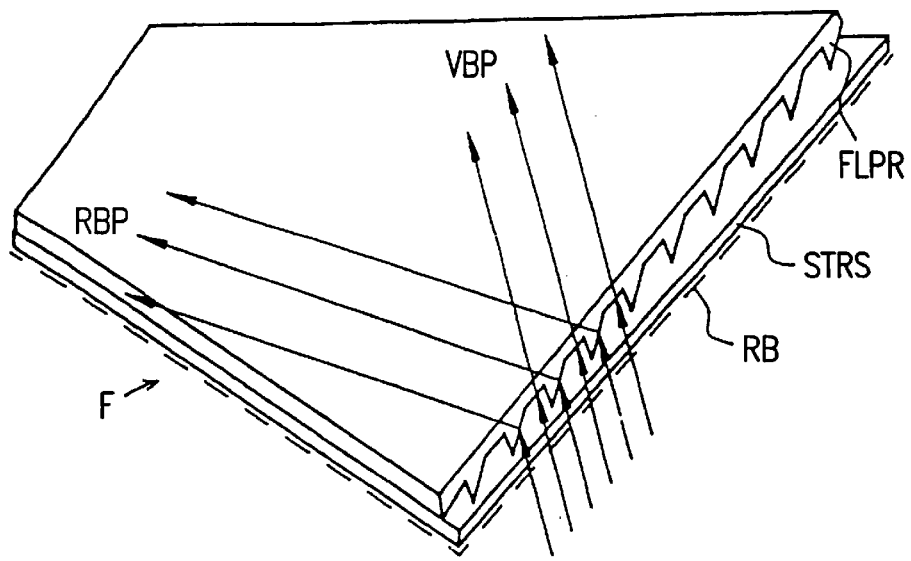
FIG. 25 is an illustration that shows the Fresnel arrangement for simultaneous display of the real back-protection and of the virtual head-up display.

FIG. 25 shows a Fresnel arrangement for a projection display that simultaneously undertakes a virtual projection into the head-up display VBP and a real back-projection RBP. A darkening of the head-up display VBP ensues mechanically or electromechanically here in that the beam path to the head-up display VBP is interrupted. As in FIG. 24, the real image in FIG. 25 is also present at a diffuser pane having low opacity STRS. The Fresnel arrangement is composed of an alternating Fresnel lens prism FLPR.

Figure 26:
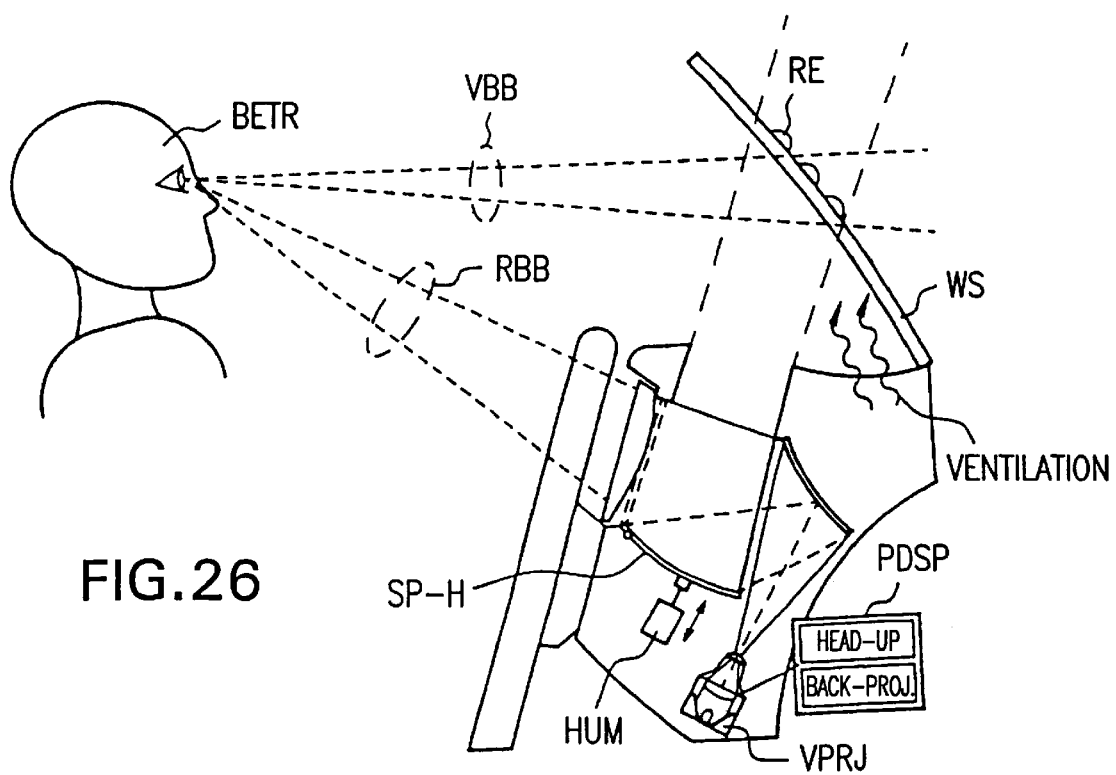
FIG. 26 is an illustration that shows a cross-section through the cockpit of a motor vehicle.

FIG. 26 shows a cross-section in the cockpit of a motor vehicle wherein a viewer BETR sees a virtual head-up display VBB and a conventional display RBB. When drops of water form on the windshield WS, for example when it is i raining RE, then the view onto the traffic situation with the head-up display VBP is greatly impeded, particularly at night. In this case, the Fresnel arrangement F described in FIG. 25 is used only for the real back-projection, i.e. the head-up display VBB is turned off in that a head-up motor HUM moves the mirror for the deflection to the head-up display Sp-H such that the beam path is no longer projected into the windshield. The head-up display VBB is thus turned off. For the sake of completeness, the projection display PDSP and a video projector VPRJ are also shown in FIG. 26.

Figure 27:
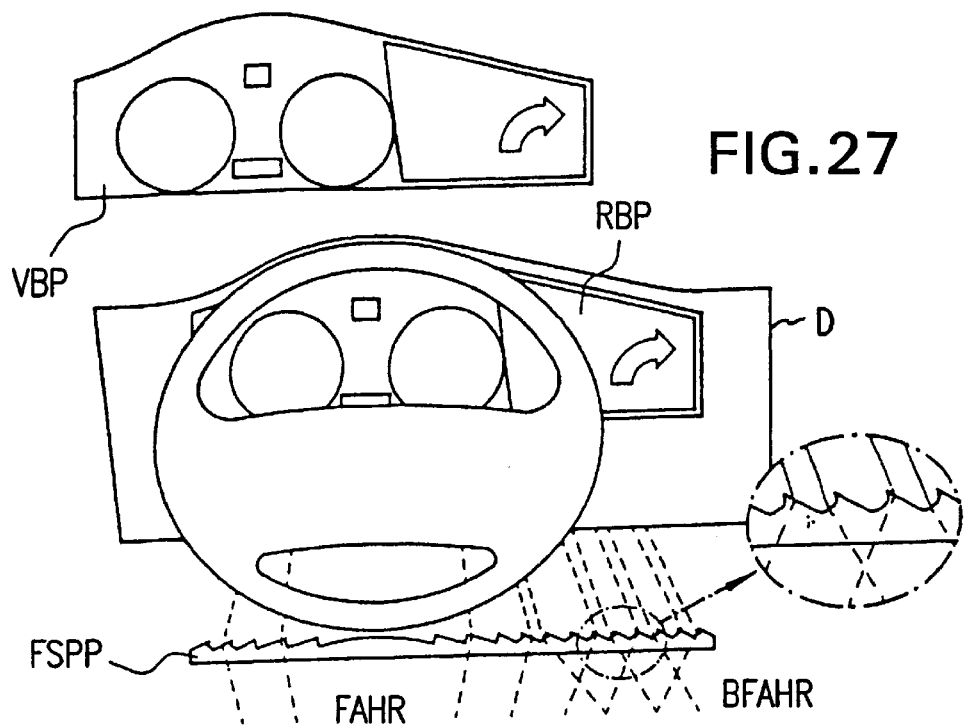
FIG. 27 is an illustration that shows an additional illumination beam path for observing the dashboards for the passenger.

FIG. 27 shows the view onto the dashboards D, wherein the head-up display VBP and the back-projection display RBP are projected. The driver FAHR simultaneously sees the head-up display VBP and the back-projection display RBP. The illumination beam path follows all movements of the driver FAHR. In order to also enable the passenger in BFAHR to view a prescribable selection of displays, an additional illumination beam path in these parts of the display is steered to the passenger BFAHR. To that end, a Fresnel mirror plate FSPP having a sub-structure for the expanded illumination beam path is employed.

Figure 28:
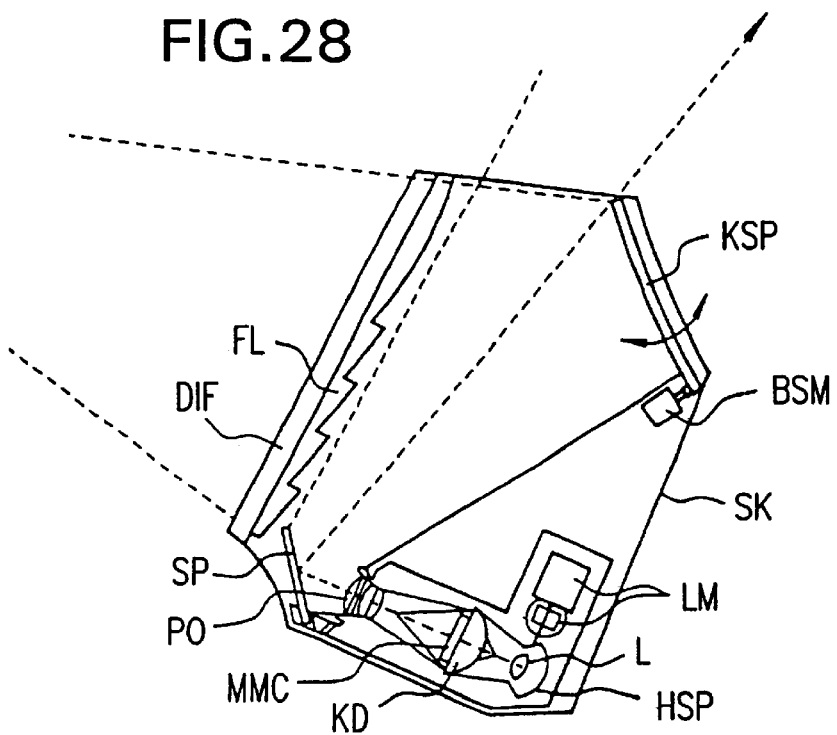
FIG. 28 is an illustration that illustrates the functional integration of the multi-media seat.

FIG. 28 shows a development of the Fresnel arrangement described in FIG. 25. Here, a combination of Fresnel prism for light deflection and Fresnel lens FL for intensified light focusing is employed, the latter in conjunction with an expanding convex lens in the back-projection display that saves structural volume. The viewing direction of the back-projection display can be swiveled with the mirror KSP via a sight-tracking motor operator BSM. Otherwise, the known elements as in the Figures described above are present again.

Figure 29:
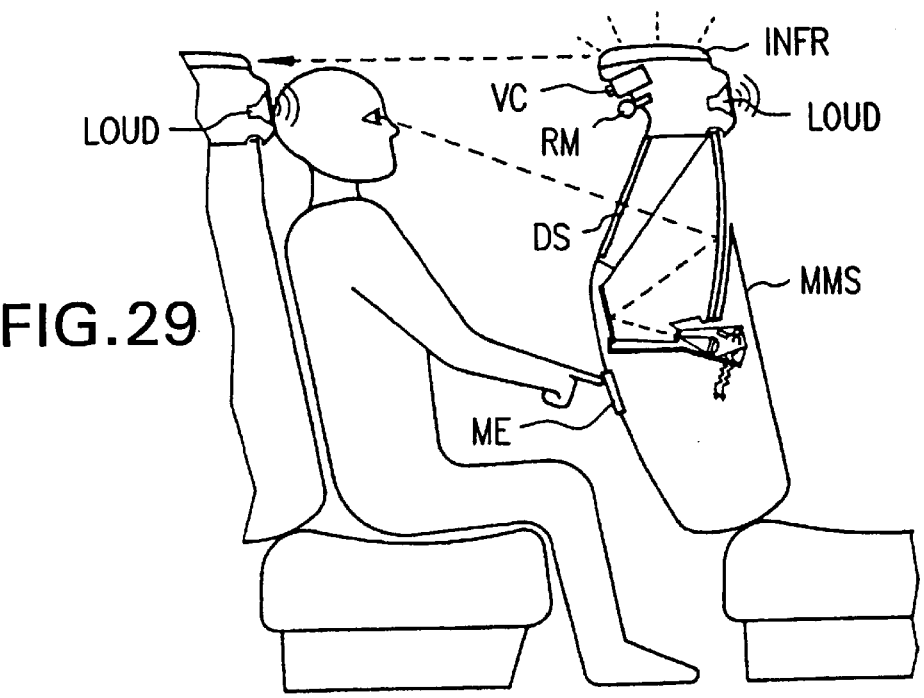
FIG. 29 is an illustration that shows that a partial enlargement of the mirror box that is employed in the multi-media seat.

FIG. 29 returns to the multimedia seat MMS of FIG. 21 and shows it in terms of its functional integration. In addition to FIG. 21, let it also be mentioned that the loudspeaker LAUT belonging to a multimedia seat MMS is supplied via the infrared interface INFR of the preceding chair. All other components of FIG. 29 are described in FIG. 21.

Figure 30:
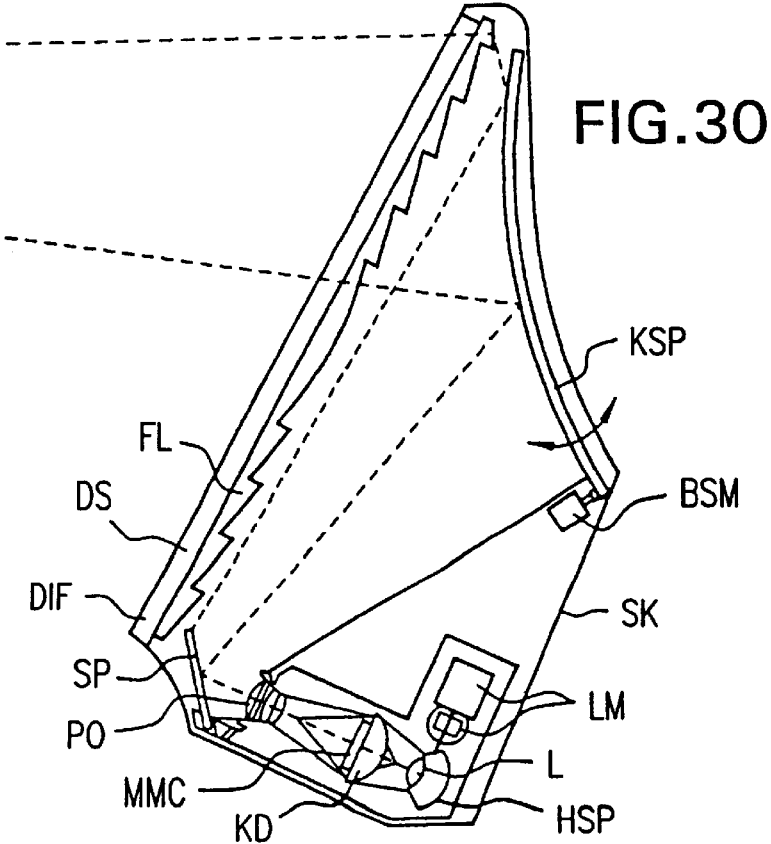
FIG. 30 is an illustration that shows the classic Koehler illumination beam path.

FIG. 30 is essentially the same as FIG. 28, wherein no possibility—as in a motor vehicle—of virtual projection into a head-up display is established. The display screen DS is slightly diffused. As a result of the camera-control pupil servo, large angles of view are foregone in favor of luminous intensity.

FIG. 31 shows a classic Köhler illumination beam path. The lamp L is expanded for uniform irradiation of a video display VOIS, and the condenser magnification KD is selected such that the image of the lamp L just fills out the objective aperture PO. Given the illumination beam path for the pupil HSP servo in FIG. 32, the illumination pupil HSP is arranged displaceable according to the required projection angle.

Figure 33:
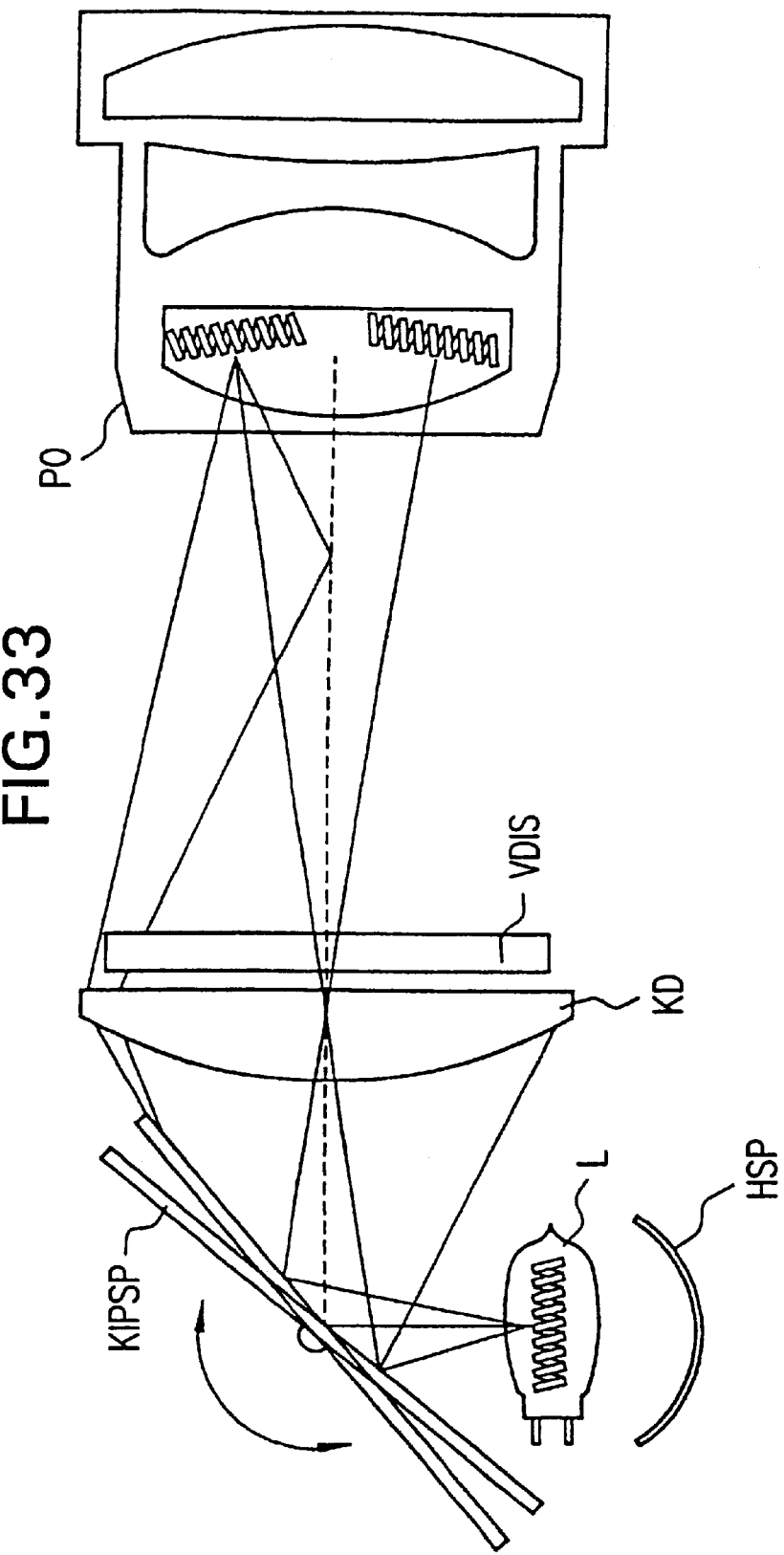
FIG. 33 is an illustration that shows a variable-size head-up display.

In FIG. 33, finally, the illumination beam path of the lamp L is deflected by a tilting mirror KIPSP onto the condenser KD to the video display VDIS. The illumination pupil is displaceable as in FIG. 32; in FIG. 33, however, only the comparatively light weight tilting mirror KIPSP has to be moved.

FIG. 33 illustrates the invention with reference to the example of a motor vehicle. The combined display means is partly realized as back-projection display RPD in the dashboard ARM and is partly realized as head-up display HUD in the windshield WSS of the vehicle. The head-up display HUD is thereby implemented variable. Dependent on the area of employment, for example quantity of information to be displayed, the size of the head-up display HUD can be expanded, so that it covers the areas 1, 2, 3 and 4 indicated in FIG. 34. Correspondingly, the head-up display HUD can also extend over a prescribably large part of the windshield WSS.

According to the described arrangement, the invention then makes it possible to project a presentation partly into the head-up display HUD and to partly present it in the back-projected form RPD. Information can then be suitably displayed in the unit composed of the two display devices. It is thus possible to present a list with telephone numbers sorted according to prescribable criterion such that high-priority data are presented in the upper part of the head-up display HUD and lower-priority data are then displayed in the back-projection display RPD. A selection of, for example, a telephone number from a list ensues with the input unit EING indicated in FIG. 34 that is advantageously located at the steering wheel LR in order to assure that the driver has a dependable operation of this input unit EING even while driving.

Each partial display means can be application-specifically configured and suitably react to environmental stimuli such as, for example, whisk of glare ice or sudden speed limit or operating prompts, for example an incoming call, in that a corresponding display is offered to the user (the driver in this case). Accordingly, for example, instruments such as, for example, tachometer, fuel tank display, light control display;

virtual devices such as, for example, radio, navigation device, telephone; and virtual control elements such as, for example, direction keys, telephone keyboard, and selection bar scrollable background in lists can be presented in the combined display means.

The invention thus makes a contribution to the ergonomic presentation of information and also enables a flexible adaptation to prescribable demands in view of the dynamic display possibilities.

In conclusion, let it be noted that the display means in the dashboard can also, for example, be a matter of a simple display instead of the back-projected display RPD.

Although modifications and changes may be suggested by those of ordinary skill in the art, it is the intention of the inventors to embody within the patent warranted hereon all changes and modifications as reasonably and properly come within the scope of their contribution to the art.

What is claimed is:

1. An information display system for at least one person, comprising:

a first display unit for presentation of information on a windshield of a vehicle as a head-up display;

a second display unit for the presentation of information on the dashboard of the vehicle;

optical means that adjust the presentation in a direction of view of the person, wherein an illumination beam path is adapted to the direction of view of the person;

a Fresnel prism displaceable in the illumination beam path, the Fresnel Prism deflecting the illumination beam path, whereby parts of the information are selectively presented graduation-free in the first display unit and the second display unit.

2. The information display system according to claim 1, further comprising a projection display having a video display; a light source that illuminates the video display; and an adjustor that adjusts an illumination direction of the light source.

3. The information display system according to claim 2, wherein the video display is driven with a computer and is illuminated by the light source.

4. The information display system according to claim 2, wherein the video display further comprises a brightness adaptor having filters that absorb light, the filters selected from the group comprising grey filters and polarization filters, wherein when the grey filters are pivoted in and the polarization filters are turned relative to one another the projection display is darkened.

5. The information display system according to claim 1, further comprising a brightness adaptor that adapts a first brightness of the first display unit to a second brightness of a scene to be observed, wherein the second brightness is determined as a criteria for a control of the first brightness.

6. The information display system according to claim 1, wherein the optical means comprises at least one prism and at least one lens, wherein the prism deflects the illumination beam path into an eye of the person and the lens focuses the illumination beam path.

7. The information display system according to claim 1, wherein a first part of the information display system is implemented from the group consisting of a traditional display means and a back-projection display; wherein a second part of the information display system is implemented as the head-up display; and wherein whereby the first part together with the second part of the information display system forms a combined display means for the presentation of information.

8. The information display system according to claim 7, wherein the head-up display is variable in size.

9. The information display system according to claim 7, wherein the combined display means prioritizes the information according to high-priority and low-priority and displays the high-priority information to the person in the second part of the information display and displays low-priority information in the first part of the information display.

10. The information display system according to claim 9, wherein the data is displayed by the combined display means sorted according to a priority of the data.

11. The information display system according to claim 7, wherein the first part of the information display system and the second part of the information display system are the same width and are respectively implemented wider than high.

12. The information display system according to claim 7, wherein a distortion-corrected image is presented on the head-up display dependent on a position of the person, and wherein an image being predistorted corresponding to the position of the person and being inverse to distortions effected by the windshield is presented on the video display.

13. An information display system for presentation of information for at least one person in a vehicle, comprising:

a first reflective surface, whereon the information is presented in a first field of view of the person;

a second reflective surface, whereon the information is presented in a second field of view of the person;

optics that direct the presentation of information in a direction of view of the person; and a prism that selectively deflects part of the information on the first and second reflective surfaces.

14. The information display system according to claim 13, wherein the first reflective surface is a windshield of the vehicle.

15. The information display system according to claim 13, wherein the second reflective surface is a dashboard display unit.

16. The information display system according to claim 13, wherein the prism is a Fresnel prism.

* * * * *